United States Patent
Anderson

(10) Patent No.: US 8,484,215 B2
(45) Date of Patent: Jul. 9, 2013

(54) FUZZY DATA OPERATIONS

(75) Inventor: Arlen Anderson, Kidlington (GB)

(73) Assignee: Ab Initio Technology LLC, Lexington, MA (US)

( * ) Notice: Subject to any disclaimer, the term of this patent is extended or adjusted under 35 U.S.C. 154(b) by 221 days.

(21) Appl. No.: 12/605,007

(22) Filed: Oct. 23, 2009

(65) Prior Publication Data

US 2010/0106724 A1   Apr. 29, 2010

Related U.S. Application Data

(60) Provisional application No. 61/107,971, filed on Oct. 23, 2008.

(51) Int. Cl.
*G06F 7/00* (2006.01)

(52) U.S. Cl.
USPC .......................................... 707/737; 707/780

(58) Field of Classification Search
USPC ................................. 707/737, 780
See application file for complete search history.

(56) References Cited

U.S. PATENT DOCUMENTS

| | | | |
|---|---|---|---|
| 5,179,643 A | 1/1993 | Homma et al. | |
| 5,388,259 A | 2/1995 | Fleischman et al. | |
| 5,832,182 A | 11/1998 | Zhang et al. | |
| 6,026,398 A | 2/2000 | Brown et al. | |
| 6,456,995 B1 * | 9/2002 | Salo et al. ...................... | 707/703 |
| 6,493,709 B1 | 12/2002 | Aiken | |
| 6,581,058 B1 | 6/2003 | Fayyad et al. | |
| 6,658,626 B1 | 12/2003 | Aiken | |
| 7,043,476 B2 | 5/2006 | Robson | |
| 7,246,128 B2 | 7/2007 | Jordahl | |
| 7,283,999 B1 | 10/2007 | Ramesh et al. | |
| 7,472,113 B1 | 12/2008 | Watson et al. | |
| 7,672,833 B2 | 3/2010 | Blume et al. | |
| 8,032,546 B2 | 10/2011 | Arasu et al. | |
| 2002/0099536 A1 | 7/2002 | Bordner et al. | |
| 2002/0124015 A1* | 9/2002 | Cardno et al. ................ | 707/204 |
| 2003/0018652 A1 | 1/2003 | Heckerman et al. | |
| 2003/0033138 A1 | 2/2003 | Bangalore | |
| 2003/0120630 A1 | 6/2003 | Tunkeland | |

(Continued)

FOREIGN PATENT DOCUMENTS

| | | |
|---|---|---|
| EP | 1302873 | 4/2003 |
| EP | 1962209 | 8/2008 |

(Continued)

OTHER PUBLICATIONS

"Statistical Models for Partial Membership", Heller et al. Engineering Department, University of Cambridge, Cambridge, UK, copyright 2008.*

(Continued)

*Primary Examiner* — Cindy Nguyen

(74) *Attorney, Agent, or Firm* — Fish & Richardson P.C.

(57) ABSTRACT

A method for clustering data elements stored in a data storage system includes reading data elements from the data storage system. Clusters of data elements are formed with each data element being a member of at least one cluster. At least one data element is associated with two or more clusters. Membership of the data element belonging to respective ones of the two or more clusters is represented by a measure of ambiguity. Information is stored in the data storage system to represent the formed clusters.

61 Claims, 9 Drawing Sheets

U.S. PATENT DOCUMENTS

| | | | |
|---|---|---|---|
| 2004/0015498 | A1 | 1/2004 | Rabaioli |
| 2004/0036716 | A1 | 2/2004 | Jordahl |
| 2004/0073534 | A1 | 4/2004 | Robson |
| 2004/0139072 | A1 | 7/2004 | Broder et al. |
| 2005/0038784 | A1 | 2/2005 | Zait et al. |
| 2005/0120011 | A1 | 6/2005 | Dehlinger et al. |
| 2006/0004744 | A1 | 1/2006 | Nevidomski |
| 2006/0059173 | A1 | 3/2006 | Hirsch et al. |
| 2006/0059207 | A1 | 3/2006 | Hirsch et al. |
| 2007/0156614 | A1 | 7/2007 | Flinn et al. |
| 2007/0239741 | A1* | 10/2007 | Jordahl ......................... 707/100 |
| 2008/0162533 | A1 | 7/2008 | Mount et al. |
| 2009/0055380 | A1 | 2/2009 | Peng et al. |
| 2009/0171955 | A1 | 7/2009 | Merz et al. |
| 2009/0182728 | A1 | 7/2009 | Anderson |
| 2009/0234826 | A1 | 9/2009 | Bidlack |
| 2010/0106724 | A1 | 4/2010 | Anderson |
| 2010/0268724 | A1 | 10/2010 | Nevidomski et al. |
| 2010/0274785 | A1 | 10/2010 | Procopiuc et al. |

FOREIGN PATENT DOCUMENTS

| | | |
|---|---|---|
| JP | 10275159 | 10/1998 |
| JP | 11184884 | 7/1999 |
| WO | WO2005/073881 | 8/2005 |
| WO | WO 2006/102227 | 9/2006 |

OTHER PUBLICATIONS

Ananthakrishna, Rohit et al., "Eliminating Fuzzy Duplicates in Data Warehouses." *Proceedings of the 28$^{th}$ VLDB Conference*, Hong Kong, China, 2002. 12 pages.

Bocek, Thomas et al., "Fast Similarity Search in Large Dictionaries." *Technical Report, Department of Informatics, University of Zurich*, Apr. 2007. 32 pages.

Bocek, Thomas et al., "Fast-Similarity Search in Peer-to-Peer Networks." *Network Operations and Management Symposium*, 2008. NOMS 2008, IEEE, Aug. 26, 2008. pp. 240-247.

Chaudhuri, Surajit, Presentation: "Robust and Efficient Fuzzy Match for Online Data Cleaning." *Databases and Information Management Seminar*, Stanford University. Downloaded from <http://www.cs.ucsb.edu/~gayatri/Presentations/Robust%20and%20Efficient%20Fuzzy%20Match%20for%20Online%20Data.ppt> on Oct. 19, 2009. 33 pages.

Christen, Peter, "Febrl—A Freely Available Record Linkage System with a Graphical User Interface." *Australasian Workshop on Health Data and Knowledge Management (HDKM 2008), Wollongong, NSW, Australia, Conferences in Research and Practice in Information Technology (CRPIT)*, vol. 80, 2008. 9 pages.

Christen, Peter et al., "Towards Scalable Real-Time Entity Resolution Using a Similarity-Aware Inverted Index Approach." *Seventh Australasian Data Mining Conference (AusDM 2008), Glenelg, Australia, Conferences in Research and Practice in Information Technology (CRPIT)*, vol. 87, 2009. 10 pages.

Du, Mengmeng, "Approximate Name Matching." Master's Thesis in Computer Science at the School of Computer Science and Engineering, Royal Institute of Technology, Stockholm, Sweden, 2005. 55 pages.

Gravano, Luis et al., "Approximate String Joins in a Database (Almost) for Free." *Proceedings of the 27$^{th}$ VLDB Conference*, Roma, Italy, 2001. 10 pages.

International Search Report and Written Opinion issued in PCT application No. PCT/US08/88530, mailed Feb. 23, 2009, 7 pages.

Navarro, Gonzalo, "A Guided Tour to Approximate String Matching." *ACM Computing Surveys*, vol. 33, No. 1, Mar. 2001. pp. 31-88.

Navarro, Gonzalo et al., "Indexing Methods for Approximate String Matching." *IEEE Data Engineering Bulletin*, 24 (4), 2001. pp. 19-27.

Novak, David et al., Presentation: "Metric Index: An Efficient and Scalable Solution for Similarity Search." *SISAP 2009*, Prague, Aug. 29, 2009. 26 pages.

Yamamoto, Eiko, "Dynamic Programming Matching for Large Scale Information Retrieval." In *Proceedings of the Sixth International Workshop on Information Retrieval with Asian Languages*, 2003. pp. 100-108.

Zadeh, L.A., "Fuzzy Sets." *Information and Control 8*, 1965. pp. 338-353.

International Search Report and Written Opinion issued in PCT application No. PCT/US2009/061899, mailed Mar. 16, 2010, 13 pages.

Pedrycz, Witold et al. "Fuzzy Systems Engineering Toward Human-Centric Computing, " IEEE Press, Hoboken, New Jersey, Wiley & Sons, Inc. 2007.

Atallah, M. J., et al., "A Randomized Algorithm for Approximate String Matching," *Algorithmica*, vol. 29, Springer-Verlag, New York, NY, 2001, pp. 468-486.

Buss, Samuel R., et al., "A Bipartite Matching Approach to Approximate String Comparsion and Search," CiteseerX—Scientific Digital Library and Search Engine, 1995, pp. I and 1-19.

Chaudhuri, Surajit, et al., "Robust and Efficient Fuzzy Match for Online Data Cleaning," SIGMOD 2003, San Diego, CA, Jun. 9-12, 2003, pp. 313-324.

Gu, Lifang, et al., "Adaptive Filtering for Efficient Record Linkage," *Proceedings of the 4$^{th}$ SIAM International Conf. on Data Mining*, Lake Buena Vista, FL, Apr. 22-24, 2004, pp. 477-481.

"Inverse (mathematics)," Wikipedia, downloaded from: en.wikipedia.org/wiki/Inverse_(mathematics), Apr. 5, 2010, 1 page.

Marzal, Andrés et al., "Speeding Up the Computation of the Edit Distance for Cyclic Strings," *Proceedings of the 15$^{th}$ International Conference on Pattern Recognition*, Barcelona, Spain, Sep. 3-7, 2000, pp. 891-894.

Microsoft Computer Dictionary, Microsoft Press, Redmond, WA, 2002, p. 446.

Navarro, Gonzalo, et al., "Compressed Full-Text Indexes," ACM Computing Surveys (CSUR), Vol. 39, Issue 1, Apr. 2007, pp. 1-66.

Parizeau, Marc et al., "Optimizing the Cost Matrix for Approximate String Matching Using Genetic Algorithms," Pattern Recognition, vol. 31, No. 4, 1998, pp. 431-440.

Baeza-Yates, Ricardo A. et al., "Fast and practical approximate string matching." Information Processing Letters, vol. 59, Issue 1, Jul. 8, 1996, pp. 21-27.

Monge, Alvaro E. et al., "An efficient domain-independent algorithm for detecting approximately duplicate database records." CiteSeer 1997, pp. 1-7.

Hassanzadeh, Oktie, et al., "Accuracy of Approximate String Joins Using Grams," VLDB '07, Sep. 23-28, 2007, 8 pages.

Supplementary European Search Report, EP 08870601, dated Jul. 16, 2012, 7 pages.

Winkler, William E., "Frequency-Based Matching in Fellegi-Sunter Model of Record Linkage." Bureau of the Census Statistical Research Division, Statistical Research Report Series No. RR2000/06, issued Oct. 4, 2000, 14 pages.

Abdule-Wahab, Rasha S., et al., "New Directions to Improve Clustering with a Scatter Search Based Algorithm." Technical Report 283—Laboratoire d'Informatique, 2005, 4 pages.

Cohen, William, et al., "Learning to Match and Cluster Entity Names." In ACM AIGIR-2001 Workshop in Mathematical/Formal Methods in Retrieval, 2001, 9 pages.

De Vries, Timothy et al., "Robust Record Linkage Blocking Using Suffix Arrays." CIKM'09, Nov. 2-6, 2009, 10 pages.

Ester, Martin, et al., "Incremental Clustering for Mining in a Data Warehousing Environment," Proceedings of the 24$^{th}$ VLDB Conference, USA, 1998, 11 pages.

Hylton, Jeremy, "Identifying and Merging Related Bibliographic Records." Master's Degree Thesis, MIT, Jun. 1996, 99 pages.

IQ Associates, "Typical Match Merge Process Flowchart." 2009, 1 page.

Jain, A.K., et al., "Data Clustering: A Review." ACM Computing Surveys, vol. 31, No. 3, Sep. 1999, pp. 264-323.

Kim, Hung-sik, et al., "HARRA: Fast Iterative Hashed Record Linkage for Large-Scale Data Collections." EDBT 2010, Mar. 22-26, 2010, Lausanne, Switzerland, 12 pages.

Lewis, David D., et al., "RCV1: A New Benchmark Collection for Text Categorization Research." Journal of Machine Learning Research 5 (2004), pp. 361-397.

McCallum, Andrew, et al., "Efficient Clustering of High-Dimensional Data Sets with Application to Reference Matching." KDD 2000, Boston, MA, pp. 169-178.

Medvedev, Timofey, et al., "Company Names Matching in the Large Patents Dataset." Hewlett-Packard Development Company, L.P, Jul. 21, 2011, 7 page.

Sahoo, Nachiketa, et al., "Incremental Hierarchical Clustering of Text Documents." CIKM'06, Nov. 5-11, 2006, pp. 357-366.

Talend White paper, "Matching Technology Improves Data Quality." 2010, 18 pages.

Whang, Steven, et al., "Entity Resolution wih Iterative Blocking." SIGMOD'09, Jun. 29-Jul. 2, 2009, 13 pages.

Young, Steven, et al., "A Fast and Stable Incremental Clustering Algorithm." Seventh International Conference on Information Technology, Apr. 12-14, 2010, 6 pages.

International Search Report and Written Opinion issued in PCT application No. PCT/US2012/065265, mailed Feb. 18, 2013, 12 pages.

Japanese Office Action, with English translation, application No. 2010-543117, mailed Feb. 4, 2013, 18 pages.

International Search Report PCT Application, PCT/US2012/065249, mailed Mar. 12, 2013, 12 pages.

International Search Report, PCT Applications, PCT/US2012/065255, mailed Mar. 12, 2013, 12 pages.

Zorilla, M.E., et al., "Vertical Partitioning Algorithms in Distributed Databases," Jan. 1, 2007, Computer Aided Systems Theory—Eurocast '99 Lecture Notes in Computer Science, pp. 465-474.

* cited by examiner

FUZZY DATA OPERATIONS

CROSS-REFERENCE TO RELATED APPLICATIONS

This application claims priority to U.S. Application Ser. No. 61/107,971, entitled "FUZZY DATA OPERATIONS," filed on Oct. 23, 2008, incorporated herein by reference.

BACKGROUND

This description relates to fuzzy data operations in the field of data management.

Data operations, such as clustering, join, search, rollup, and sort, are employed in data management to handle data. Clustering is an operation that classifies data into different groups. Join combines two pieces of data together. Search by a key finds data entries that match that key. Rollup is an operation that calculates one or more levels of subtotals (or other combinations) across a group of data. Sort is an operation that orders data.

Data quality is important in data management. Mistakes or inaccuracies resulting from data operations degrade data quality. For example, classifying an employee of Corporation ABC, John Smith, as a temporary worker or a permanent worker entitles John Smith to a different level of benefits. Erroneous classification of John Smith's employment status, e.g., mistakes in data operation clustering, affects the quality of Corporation ABC's human resource data.

Some implementations of data operations rely on exact comparison of field values ("keys") to identify matching records, to define groups of related records or to link records. When data is ambiguous, imperfect, incomplete, or uncertain, methods based on exact comparison of field values may break down.

When there is an inherent ambiguity associated with a data operation, for example, clustering, one approach to resolve the ambiguity may be simply to ignore the ambiguity and to force a piece of data into a particular group. For example, the employee of Corporation ABC, John Smith, works for both the marketing department and the R&D department. In Corporation ABC's human resource database, John Smith may be associated with either the marketing department or the R&D department, but often is associated with just one department. The forced classification of the piece of data into a particular group may mask the inherent ambiguity and adversely affect data quality.

When there is an uncertainty associated with a data operation, for example, clustering, because of a pending outcome of an event, for example, a legal dispute between entity A and entity B that involves the ownership of a piece of an asset, forcing a piece of data into a particular group may not be the best approach to address the fluidity of the situation. Prior to the adjudication, the ownership of the asset is uncertain. Assigning the asset to either A or B may turn out to be inaccurate.

When there is an uncertainty associated with a data operation, for example, rollup, because of an ambiguous identification of group membership, assigning membership to one group among several alternatives to preserve accounting integrity may give a misleading picture. For example, a bank may be interested in determining its exposure on loans to counterparties for risk assessment and regulatory purposes. Identification of a counterparty is often made by company name, which may lead to ambiguous identifications because of wide variability in the recorded form of a company's name. In turn, this means assignment of loan exposures to counterparties is ambiguous. It may happen that loans properly associated to one company become divided among several apparently distinct companies, which actually are simply variant forms of the name of the one company. This results in understating the exposure of the bank to any single counterparty. Alternatively, if an arbitrary selection among alternatives is made, an exposure may be falsely assigned to one counterparty when it properly belongs to another, perhaps overstating the exposure to the first and understating it to the second.

When there is an uncertainty associated with a data operation, for example, join, because of incorrect or missing information, forcing a piece of data into a particular group or ignoring the piece of data may result in either a false association or loss of information. For example, when attempting to join tables from two different databases, there is often no common key shared by the database tables. To overcome this, data within the tables, e.g. customer address, is used to infer a relation between records in the two databases. Address information may however be incorrect or incomplete. Suppose address validation against a definitive reference set, like a Postal Address File, shows the house number on a record in table A is invalid (no house exists with that house number) while there are multiple addresses in table B which might be valid alternative completions of the address. Arbitrarily choosing a completion of the address in the record in table A may lead to a false association while ignoring the record leads to loss of information.

When there is an ambiguity associated with a data operation, e.g. search, because of inaccurate data entry, one approach is to propose a single alternative or a simple list of alternative corrections. If this is part of the validation process of data being entered into a database by an operator, a single alternative when multiple alternatives exist may lead the operator into a false sense of security in accepting the correction. If a simple list of alternatives is provided, the operator may have no rational basis for choosing among the alternatives. If a single choice is required and some degradation of data quality is accepted for a wrong choice, then minimizing and quantifying the possible loss of data quality becomes the objective.

SUMMARY

In general, in one aspect, a method for clustering data elements stored in a data storage system includes reading data elements from the data storage system. Clusters of data elements are formed with each data element being a member of at least one cluster. At least one data element is associated with two or more clusters. Membership of the data element belonging to respective ones of the two or more clusters is represented by a measure of ambiguity. Information is stored in the data storage system to represent the formed clusters.

Aspects may include one or more of the following features.

Each value of the measure of ambiguity representing a membership of the data element belonging to a respective one of the two or more clusters may be between zero and one.

Values of the measure of ambiguity representing the memberships may be related to the likelihood of the data element belonging to the respective ones of the two or more clusters.

A sum of each value of the measure of ambiguity representing a membership of the data element belonging to a respective one of the two or more clusters may be one.

The method may include preserving accounting integrity using values of the measure of ambiguity.

Accounting integrity for a given quantity may be achieved by weighting the quantity with values of the measure of ambiguity.

The method may include performing a data operation that uses values of the measure of ambiguity representing the memberships.

The data operation may include a rollup that calculates a weighted subtotal of a quantity within a first cluster of the one or more clusters, the quantity being associated with the data element, and the subtotal being calculated by summing within the first cluster the products of the value of the quantity associated with each of the data elements in the first cluster and the respective value of the measure of ambiguity representing the membership of the data elements in the first cluster.

The method may include calculating an exclusive subtotal of the quantity and an inclusive subtotal of the quantity, the exclusive subtotal being calculated by excluding the data elements in the first cluster that are associated with two or more clusters and the inclusive subtotal being calculated by including the data elements in the first cluster that are associated with two or more clusters.

Values of the measure of ambiguity representing the memberships may be established based on a function, the function representing relationships between the data element and the two or more clusters.

The relationships represented by the function may be related to the likelihood of the data element belonging to respective ones of the two or more clusters.

The relationships represented by the function may be based on quantified similarities between the data element and elements representing respective ones of the two or more clusters.

The elements representing the respective ones of the two or more clusters may be keys of the respective clusters.

In some arrangements, values of the measure of ambiguity of the data element belonging to each cluster of the two or more clusters may be equal for each cluster.

Values of the measure of ambiguity of the data element belonging to each cluster of the two or more clusters may be based on observed frequencies of the data element in a reference set.

Each cluster of the two or more clusters may represent a different potential error in the data element. Values of the measured ambiguity of the data element belonging to each cluster of the two or more clusters may be based on the likelihood of the potential error in the data element represented by each cluster.

Forming data clusters may include forming a plurality of superclusters of data elements and for each supercluster forming clusters of data elements within the supercluster.

Forming each supercluster may include determining matches between objects in different data elements based on a variant relation between the objects in the different data elements.

The variant relation between a first object and a second object may corresponds to a value of a function representing a distance between the first object and the second object being below a predetermined threshold.

In some arrangements, variant relation may not be an equivalence relation.

At least one data element may be in more than one supercluster.

In another aspect, in general, a system for clustering data elements stored in a data storage system includes: means for reading data elements from the data storage system; means for forming clusters of data elements with each data element being a member of at least one cluster; means for associating at least one data element with two or more clusters, with memberships of the data element belonging to respective ones of the two or more clusters being represented by a measure of ambiguity; and means for storing information in the data storage system to represent the formed clusters.

In another aspect, in general, a computer-readable medium storing a computer program for clustering data elements stored in a data storage system is described. The computer program includes instructions for causing a computer to: read data elements from the data storage system; form clusters of data elements with each data element being a member of at least one cluster; associate at least one data element with two or more clusters, with memberships of the data element belonging to respective ones of the two or more clusters being represented by a measure of ambiguity; and store information in the data storage system to represent the formed clusters.

In another aspect, in general, a method for performing a data operation that receives a key and returns one or more data elements from a data storage system includes determining multiple candidate data elements based on candidate matches between the key and values of one or more search fields of the data elements. The candidate matches are corroborated based on values of one or more comparison fields of the candidate data elements different from the search fields.

Aspects may include one or more of the following features.

The data operation may include forming clusters of data elements with each data element being a member of at least one cluster.

At least one data element may be associated with two or more clusters, with memberships of the data element belonging to respective ones of the two or more clusters being represented by a measure of ambiguity.

The data operation may include a rollup that calculates a weighted subtotal of a quantity within a first cluster of the one or more clusters, the quantity being associated with the data element, and the subtotal being calculated by summing within the first cluster the products of the value of the quantity associated with each of the data elements in the first cluster and the respective value of the measure of ambiguity representing the membership of the data elements in the first cluster.

The method may also include calculating an exclusive subtotal of the quantity and an inclusive subtotal of the quantity, the exclusive subtotal being calculated by excluding the data elements in the first cluster that are associated with two or more clusters and the inclusive subtotal being calculated by including the data elements in the first cluster that are associated with two or more clusters.

Each value of the measure of ambiguity representing a membership of the data element belonging to a respective one of the two or more clusters may be between zero and one.

Values of the measure of ambiguity representing the memberships may be related to the likelihood of the data element belonging to the respective ones of the two or more clusters.

Values of the measure of ambiguity representing the memberships may be established based on a function, the function representing relationships between the data element and the two or more clusters.

The relationships represented by the function may be related to the likelihood of the data element belonging to respective ones of the two or more clusters.

The method may further include determining membership of a given data element in a given cluster based on the values of the one or more comparison fields of the given data element.

In another aspect, in general, a system for performing a data operation that receives a key and returns one or more data elements from a data storage system includes: means for determining multiple candidate data elements based on candidate matches between the key and values of one or more search fields of the data elements; and means for corroborating the candidate matches based on values of one or more comparison fields of the candidate data elements different from the search fields.

In another aspect, in general, a computer-readable medium storing a computer program for performing a data operation that receives a key and returns one or more data elements from a data storage system is described. The computer program includes instructions for causing a computer to: determine multiple candidate data elements based on candidate matches between the key and values of one or more search fields of the data elements; and corroborate the candidate matches based on values of one or more comparison fields of the candidate data elements different from the search fields.

In another aspect, in general, a method for measuring data quality of data elements in a data storage system includes reading data elements from the data storage system. A value of a measure of ambiguity for the entry; in computed for each of one or more entries in one or more fields of the data elements. A representation of data quality of the data elements in the data storage system based on the values of the measure of ambiguity is outputted.

Aspects may include one or more of the following features.

Computing the value of the measure of ambiguity may include comparing the entries in one or more fields of the data elements to reference values. One or more variants for at least a first entry that is not an exact match to a reference value may be identified. The value of the measure of ambiguity for the first entry may be computed based on the variants for the first entry.

The value of the measure of ambiguity for the first entry may be based on the number of variants for the first entry.

The representation of data quality of the data elements in the data storage system may include a histogram plot of the number of entries having a specified number of variants.

The specified number of variants may be specified as being within a range.

The representation of data quality of the data elements in the data storage system may include a list of entries having number of variants larger than a predetermined threshold.

Computing the value of the measure of ambiguity may include determining respective frequencies of different entries in the one or more fields. The value of the measure of ambiguity for a first entry may be computed based on a relative frequency of the first entry compared to frequencies of other entries.

In another aspect, in general, a system for measuring data quality of data elements in a data storage system includes: means for reading data elements from the data storage system; means for computing, for each of one or more entries in one or more fields of the data elements, a value of a measure of ambiguity for the entry; and means for outputting a representation of data quality of the data elements in the data storage system based on the values of the measure of ambiguity.

In another aspect, in general, a computer-readable medium storing a computer program for measuring data quality of data elements in a data storage system is described. The computer program including instructions for causing a computer to: read data elements from the data storage system; for each of one or more entries in one or more fields of the data elements, compute a value of a measure of ambiguity for the entry; and output a representation of data quality of the data elements in the data storage system based on the values of the measure of ambiguity.

In another aspect, in general, a method for joining data elements from two or more datasets stored in at least one data storage system include determining matches between objects in data elements from a first dataset and objects in data elements from a second dataset based on a variant relation between the objects in the data elements from the first dataset and objects in the data elements from the second dataset. Respective data elements having respective objects determined as matches are evaluated. The data elements from the first dataset are joined with the data elements from the second dataset based on the evaluation of data elements.

Aspects can include one or more of the following features.

The variant relation between a first object and a second object may corresponds to a value of a function representing a distance between the first object and the second object being below a predetermined threshold.

The variant relation may not be an equivalence relation.

Determining a match between an object in a first data element from the first dataset and an object in a second data element in the second dataset may include determining that the variant relation holds between the object in the first data element and the object in the second data element.

Determining a match between an object in a first data element from the first dataset and an object in a second data element in the second dataset may include determining: that the variant relation holds between the object in the first data element and an object in a third data element in the first dataset, and that the variant relation hold between the object in the third data element and the object in the second data element.

Evaluating respective data elements having respective objects determined as matches may include comparison of objects in the respective data elements other than the respective objects determined as matches.

In another aspect, in general, a system for joining data elements from two or more datasets stored in at least one data storage system includes: means for determining matches between objects in data elements from a first dataset and objects in data elements from a second dataset based on a variant relation between the objects in the data elements from the first dataset and objects in the data elements from the second dataset; means for evaluating respective data elements having respective objects determined as matches; and means for joining the data elements from the first dataset with the data elements from the second dataset based on the evaluation of data elements.

In another aspect, in general a computer-readable medium storing a computer program for joining data elements from two or more datasets stored in at least one data storage system is described. The computer program including instructions for causing a computer to: determine matches between objects in data elements from a first dataset and objects in data elements from a second dataset based on a variant relation between the objects in the data elements from the first dataset and objects in the data elements from the second dataset; evaluate respective data elements having respective objects determined as matches; and join the data elements from the first dataset with the data elements from the second dataset based on the evaluation of data elements.

DESCRIPTION

The techniques for performing fuzzy data operations can be applied to a variety of types of systems including different forms of database systems storing datasets. As used herein, a dataset includes any collection of data that enables portions of data to be organized as records having values for respective fields (also called "attributes" or "columns"). The database system and stored datasets can take any of a variety of forms, such a sophisticated database management system or a file system storing simple flat files. One aspect of various database systems is the type of record structure it uses for records within a dataset (which can include the field structure used for fields within each record). In some systems, the record structure of a dataset may simply define individual text documents as records and the contents of the document represent values of one or more fields. In some systems, there is no requirement that all the records within a single dataset have the same structure (e.g., field structure).

Complex computations can often be expressed as a data flow through a directed graph (called a dataflow graph), with components of the computation being associated with the vertices of the graph and data flows between the components corresponding to links (arcs, edges) of the graph. A system that implements such graph-based computations is described in U.S. Pat. No. 5,966,072, EXECUTING COMPUTATIONS EXPRESSED AS GRAPHS, incorporated herein by reference. One approach to executing a graph-based computation is to execute a number of processes, each associated with a different vertex of the graph, and to establish communication paths between the processes according to the links of the graph. For example, the communication paths can use TCP/IP or UNIX domain sockets, or use shared memory to pass data between the processes.

Figure 1:
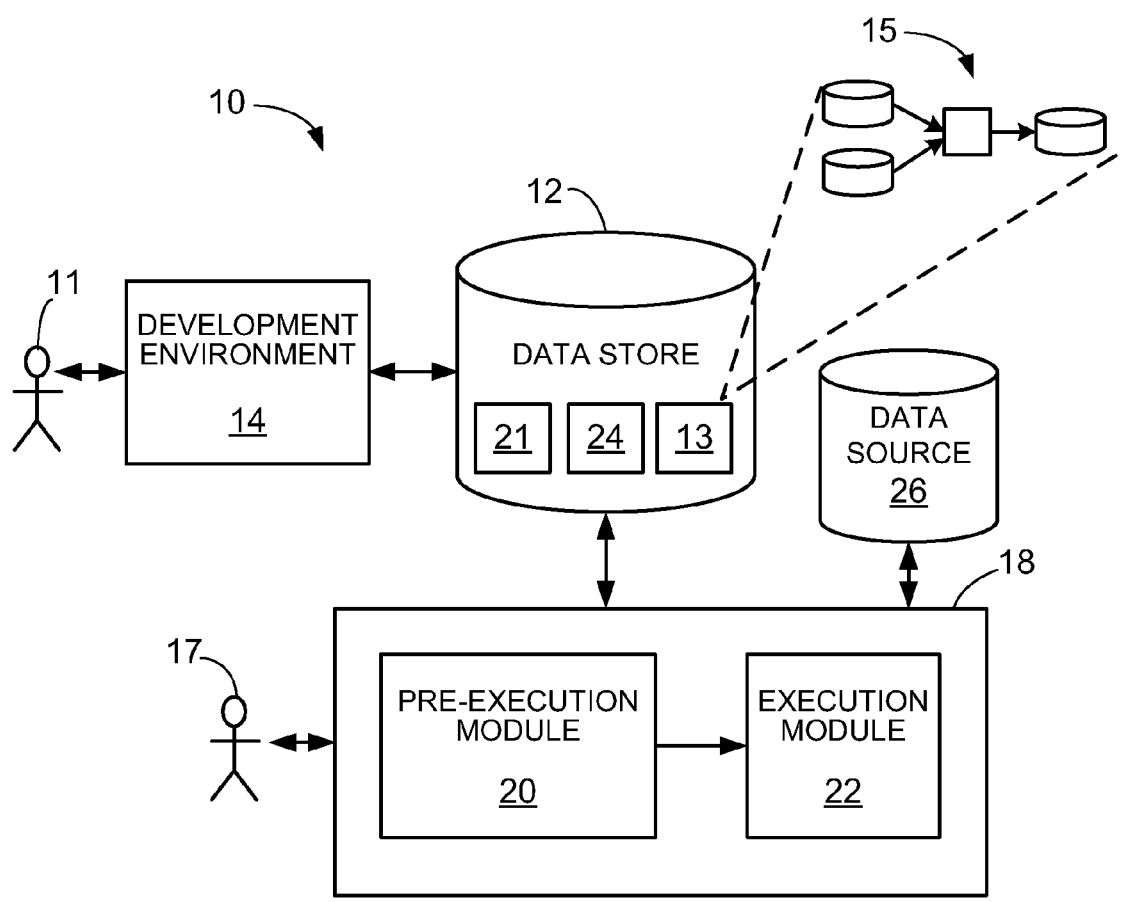
FIG. 1 is a block diagram of a system for executing graph-based computations.

Referring to FIG. 1, a system 10 for executing graph-based computations includes a development environment 14 coupled to a data store 12 and a runtime environment 18 coupled to the data store 12. A developer 11 builds applications using the development environment 14. An application can be associated with one or more dataflow graphs specified by data structures in the data store 12 which may be written to the data store as a result of the developer's use of the development environment 14. A data structure 13 for a computation graph 15 specifies, for example, the vertices (components or datasets) of a computation graph and links (representing flows of work elements) between the vertices. The data structures can also include various characteristics of the components, datasets, and flows of the dataflow graphs.

The runtime environment 18 may be hosted on one or more general-purpose computers under the control of a suitable operating system, such as the UNIX operating system. For example, the runtime environment 18 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof.

The runtime environment 18 is configured to receive control inputs from the data store 12 and/or from a user 17 for executing and configuring computations. The control inputs can include commands to process particular datasets using corresponding dataflow graphs, which are specified in the stored graph data structures. The user 17 can interact with the runtime environment 18, for example, using a command line or graphical interface.

The runtime environment 18 includes a pre-execution module 20 and an execution module 22. The pre-execution module 20 performs any pre-processing procedures and prepares and maintains resources for executing computation graphs, such as a dictionary 21 and an archive 24 used for various fuzzy operations (e.g., as described in U.S. Application Publication No. 2009/0182728, incorporated herein by reference). The dictionary 21 stores words and associated information about words appearing in a dataset. The archive 24 stores various results from pre-processing based on words, phrases, or records of the dataset. The dictionary 21 and archive 24 can be implemented in any of a variety of formats and can be organized as single collections of data or as multiple dictionaries and archives. The execution module 22 schedules and controls execution of the processes assigned to a computation graph for performing the computations of the components. The execution module 22 can interact with external computing resources coupled to the system 10 that are accessed during processing associated with the graph components, such as a data source 26 providing records from a database system. The fuzzy operations performed in the system 10 can be used for various purposes such as analyzing data to assess its quality or to organize and/or consolidate the data.

A core asset of any business or other organization is the data it holds in order to conduct its operations, from lists of products, services and customers to transactions, contracts and accounts with individuals, banks and other businesses. This data is stored in multiple formats and in multiple systems, from paper and spreadsheets to relational databases and enterprise applications, like accounting or supply-chain management systems. A central concern of every organization is the quality and integrity of this data. If invoices contain incorrect prices or mislabeled products, the wrong amount is charged or the wrong item is delivered. If addresses for customers or suppliers are wrong, shipments or orders may be delayed or lost and invoices or payments may not reach their intended party. If the key representing a customer on one system links to the accounts of a different customer on another system, reports on the state of the customer's accounts will be unreliable, and, even worse, a customer may have access to the accounts of other customers. Poor data quality disrupts the orderly conduct of business and may result in lost income, wounded reputation or missed opportunities.

An important subset of the data of a business or organization is its non-transactional reference data, sometimes referred to as its master data. This can include lists of products, customers, accounts, suppliers, and the specific valid values used to represent particular attributes of each data item (for example, a customer has a gender which may be male or female, or a product has a color which may be one of an enumerated list). Generally, master data excludes the short-term operational data of the organization, like transactions and prices. Master data management is concerned with the organization and maintenance of the reference data of an organization. One of its main concerns is with the quality and integrity of the reference data.

Problems with data quality and referential integrity take many forms. These problems are exacerbated by the existence of multiple data systems of different kinds, which may be difficult to keep consistent. A non-exhaustive list of potential problems follows.

1) Data may be entered or recorded incorrectly: the entry made is not the one intended. There may be typographical or transcription errors in the entry, resulting in variant spellings of words, for example, in customer names or addresses, product labels or descriptions, or values expected to be taken from an enumerated list. Many data entry applications have safeguards intended to validate data on entry to prevent such errors, but they still occur.

2) Data may be incomplete: not all fields are populated. A customer application may have had information missing from certain fields. The completion of a form may have been interrupted during entry. Information may have been deemed invalid on entry and discarded. Information to complete the entry may not have been available at the time of entry, perhaps pending completion of some other activity.

3) Data may be invalid: a field is populated but with an invalid value. An entry may not match any of the values expected from an enumerated list. An entry might not be valid for its expected data type, for example, there may be alphabetic characters in a decimal field or the day of a month in a date may be larger than the number of days in that month (e.g. 31 June).

4) Data may be entered in the wrong field(s). A city or zip code may appear in the street field of an address. A foreign address with a different format than expected may have been forced to fit the expected format. The product id may be in a description or comment field on an invoice or order form. The first and last names of an individual may be swapped if the surname is a common first name (e.g. Gregory Paul) or if the names are unfamiliar or foreign.

5) Standards for data entry may not exist: data may be entered inconsistently. The order of the lines of an address is not standardized and may not always be recorded in the same way, even in the same dataset. The detailed form of a company's name is not standardized and a number of variant forms may be acceptable, even in the same dataset. A customer name may contain a full middle name, or the middle name may be absent, or there may only be a middle initial. Similarly, the first name may only be an initial. "Double-barreled" last names may be present in the last name with or without a hyphen or may be split between the middle and last name fields.

6) Data may be held in free text fields. Remarks in comment fields on invoices or order forms may contain important information, like a product name or descriptive attributes, which would otherwise be missing. Description fields on a database table may contain an explanation for changes to other fields, for example, when a woman's last name changes because of marriage.

7) Key relations may be broken. Databases use keys to link related data held in different tables and sometimes in tables in different databases. When keys do not properly link the correct records, the referential integrity of the database(s) has been broken. Keys may incorrectly link records, as when one customer is linked to the accounts properly belonging to another customer. Keys may link to non-existent records, for example, the customer key on an account record does not link to any existing customer record. In some cases, the customer record exists but has a different key; the key is sometimes described as a "missing key." In other cases, when no corresponding customer record exists at all, the account record is said to be orphaned.

8) Key relations may not exist. Databases with different origins can hold similar data, but no keys exist to link data shared by them. It is not uncommon for one line of business not to realize it shares customers with another line of business. When businesses or organizations merge, the master data of the two entities may be combined. The different standards and nonequivalent valid values of the two entities make it difficult to achieve a consistent set of master data, but the problem of identifying and linking shared data, like customers, is often harder.

Data cleansing seeks to identify and correct many of these issues. Because of the number and complexity of legacy systems, the number of interfaces between systems, and the rate of introduction of new systems, the real challenge is often not how to fix the problems of data quality, but how to cope with them.

Perhaps the central concept in finding, accessing and manipulating data in the systems of a business or organization is that of a "key." A primary key is a field, or combination of fields, whose value serves to identify a record uniquely in a dataset. Within a relational database, every table may have a primary key which identifies records uniquely within the table (if the primary key is not unique, that is another data quality problem). Foreign keys in a table are keys that link to records in other tables.

A number of data operations can be performed which depend upon the keys of a database table or other dataset. The familiar key-based data operations are lookup, join, rollup, scan, sort, merge and, in parallel processing, partition by key. These data operations are based on exact agreement of keys, called here "exact matching." In the data operation lookup, a key is used to retrieve one or more records from a lookup dataset having an exactly matching key. In the data operation join, two (or more) datasets are combined a record at a time by adjoining (and perhaps subsetting) the contents of a record from one dataset with the contents of a record sharing a common key from another dataset(s). If more than one record has a matching common key, separate output records are formed for each matching record pair.

In the data operation rollup, the contents of a group of records sharing a common key are combined to produce a single output record having the same key. For example, a customer's total transaction amount would be obtained by rolling up transaction records to the customer level while summing the transaction amounts. In the data operation scan, for each record in a group of records sharing a common key, an output record is computed using the contents of all previously seen having the same key. For example, a running total of customer spending may be computed with a scan of transactions by a customer.

In the data operation sort, records are ordered by their key values. In the data operation merge, sorted data from one or more data streams are combined into a single stream such that the output stream is also sorted. In the parallel processing data operation partition by key, data is allocated to processing partitions based on the value of the key.

When multiple independent systems coexist, each of which may have data quality problems of the kinds discussed above, keys relating records with common data do not generally exist, and keys that do exist may not be reliable. Ultimately the data within each record are the items of interest. The key can be thought of as a convenient fiction introduced in a database to identify and access the data. In the absence of a reliable key, the data itself may be used for the purpose of identification.

Accessing records through their contents may be based on searching. For example, customers in one database may be sought in a second database by name. Since name is an ambiguous identifier, it is rarely a key. While a name can be used to initiate identification, supporting information such as birth date and address are generally needed to corroborate the match.

Furthermore, because of data quality issues, often neither the name nor the corroborating information need agree exactly for a record to be a correct match. Exact agreement may be too restrictive, and demanding a precise match may result in many correct identifications being missed. The data operation of (fuzzy) search retrieves data entries that match closely but not necessarily exactly. For example, a fuzzy search for "Leslie" may return a record for a person named "Lesley." In a fuzzy search, there may be more than one matching record having differing degrees of similarity or corroboration (the search on Leslie may also retrieve the record of a second person named Lesley). Candidate matches may not be corroborated sufficiently to qualify as definitive or even acceptable matches. For example, the birth date of a retrieved Lesley record may not agree with the birthdate of the Leslie record, in which case the candidate match is not corroborated.

When searching the single step process of using an exact key for a lookup is replaced by a two step process: Records are identified for retrieval using search terms and assessed to determine a match. Search terms are not keys since they rarely uniquely identify a record; however, they are used like keys to link records.

For clarity, it is useful to distinguish the field(s) from which search terms are chosen from the fields used to compare records to assess the quality of the match. These may be called search fields and comparison fields, respectively.

To find and judge matches when search terms or comparison fields are not identical, scoring functions may be used to recognize variant values. Candidate matches may be retrieved using variant search terms and evaluated using scoring functions to quantify the quality of the match between corroborating fields. These scoring functions are designed to account for various data quality issues. They recognize a match despite these issues, although with reduced score. For example, a scoring function for personal names may tolerate exchanging first and last names or using a middle initial while a scoring function tuned for company names might place more importance on word order than on missing words.

Another fundamental use of exact keys is to identify sets of records having a common key value, often called keygroups. These keygroups play a central role in many key-based data operations. When the requirement of exactly matching keys is relaxed, the question arises of how to group keys. A set of keys grouped together based on a relaxed matching criteria is called a cluster.

Generally, a cluster may be a set of records whose comparison fields meet a comparison test: For example, in one arrangement, a record is a member of cluster if its score with the cluster exceeds a threshold. There are many different ways to define the score of a record with a cluster, typically but not exclusively involving individually scoring the record with each member of the cluster and then combining the scores. For example, the score might be the maximum of the score of the record with each member of the cluster, or it might be the average of the scores with each member of the cluster. In some arrangements, scoring a pair of records involves assigning a number to the result of comparing one set of field values with the other. The comparison of field values may contain both qualitative and quantitative assessments.

The issue in defining clusters is that ambiguous membership assignments are possible because comparison of field values is a scored relation. In particular, scoring may indicate one piece of data belongs to more than one cluster. In one arrangement, this ambiguity may be handled by forcing the piece of data into one of the clusters in order to make the clusters sharply defined, as they are in the exact key case. In which case, the key-based data operations remain essentially as they are in the exact key case.

Exact-key-based data operations may not always be as precise or accurate as desired for various reasons. One reason may be the inherent ambiguity associated with a piece of data or with a data operation. For example, a piece of data may legitimately belong to more than one group. Under some clustering methods, inherent ambiguity can make accurate classification difficult or unattainable. For example, in the above mentioned human resource database, in which an employee is to be classified according to the department to which he or she belongs, the employee may belong to two departments at the same time, such as marketing and R&D. Forcefully associating the employee with either department, marketing or R&D, may be misleading. Simply associating the employee with both departments may cause double-counting problems. For instance, expenses, such as medical, may be tallied twice for the same employee.

Another reason that precise classification may not be possible is that the outcome of a pending event may impact the current classification. For example, an organization's legal status as a charitable organization or non-charitable organization may alter its tax obligations. Further suppose there is ongoing litigation between the IRS and the organization regarding whether that organization qualifies as a charitable organization and therefore deserves a tax deduction. If, in the organization's annual budget, the tax status of the organization is presumed to be that of a charitable organization and accordingly a smaller budget is set aside for tax payments, and if later the court decides that the organization is a non-charitable organization, and therefore cannot take the tax deduction entitled only to a charitable organization, the annual budget has to be revamped. The traditional way of handling such a situation is often by appending a note to the budget explaining the possible adverse court decision that may affect the budget. In the event that the adverse court decision occurs the budget has to be revised. But worse than having to correct the budget, if the budget has been used by other applications, in other business areas, or in other countries, corrections beyond the budget itself may be impossible because the ripple effects may be impossible to trace.

The above two examples illustrate how conventional data approaches may not be adequate for handling ambiguous assignments to clusters ("partial membership"). Ambiguous assignments arise when a one-to-one match to a cluster cannot be ascertained or may be better not to be ascertained. One challenge presented by allowing assignments to multiple clusters is how to preserve accounting integrity. The method of partial membership can be used for this purpose and will be discussed in detail later in this disclosure. To handle clusters containing elements with ambiguous membership, fuzzy data operations may be used.

When clusters have elements with overlapping membership and some data is associated to more than one cluster, the data operation of fuzzy rollup may be used to perform calculations while preserving accounting integrity and reporting the range of error associated with possible alternative assignments. In the human resources example, a fuzzy rollup operation may be used to total expenses by department. If an employee works for more than one department expenses for that employee may be allocated among the departments, reflecting the employee's partial membership.

When cluster membership is either conditional on future events, as in the legal example above, or uncertain because of ambiguous or incomplete information, as in the determination of counterparties in the banking example above, then a fuzzy rollup operation to compute, for example, monetary totals by group, should reflect this uncertainty while preserving accounting integrity. Certainly, in the case of an uncertain future event, such as the tax classification of a company, one eventuality does occur. Premature assignment to a particular alternative may give a misleading picture for the purposes of planning and risk assessment.

Figure 2A:
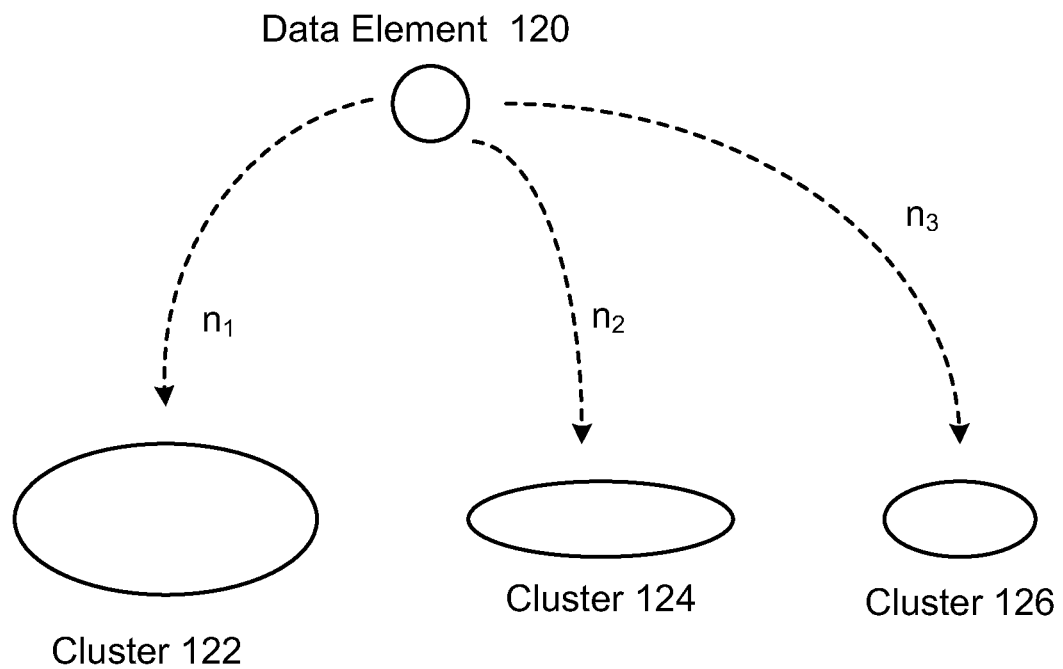
FIG. 2A is an example of a data element belonging to multiple clusters.

For example, in FIG. 2A, it is uncertain whether data element 120 belongs to cluster 122, cluster 124, or cluster 126. It may be that the data element 120 belongs to the three clusters 122, 124, and 126 at the same time. It may also be that the data element 120 belongs to one cluster at one particular time but rotates among the three clusters. The memberships of data element 120 belonging to clusters 122, 124, and 126 are represented by $n_1$, $n_2$, and $n_3$. $n_1$, $n_2$, and $n_3$ are fractional numbers. In the case where the data element 120 belongs to the three clusters at the same time with equal probabilities, $n_1$, $n_2$, and $n_3$ each may be assigned a fractional number ⅓. In this case, the sum of the partial memberships of data element 120 belonging to cluster 122, 124, and 126 is one (⅓+⅓+⅓=1). In an example in which the data element 120 belongs to one cluster at one particular time but rotates among the three clusters, at time $t_1$, $n_1$, $n_2$, and $n_3$ may be of values 1, 0, and 0. At time $t_2$, $n_1$, $n_2$, and $n_3$ may be of values 0, 1, and 0. The values of $n_1$, $n_2$, and $n_3$ may vary, but the sum of their values should always be one.

In the banking example, knowing the maximum and minimum exposures to each counterparty, based on alternative assignments of exposures to ambiguously identified counterparties, gives a more complete picture of the possible exposure to any given counterparty and communicates the uncertain state of knowledge. Current beliefs about the future or on the likely resolution of ambiguities can be incorporated by weighting the assignment of members to clusters using probable likelihoods of membership, and these weights may be refined over time to reflect changing state of knowledge.

The operation of fuzzy join enables two or more datasets to be combined when they do not share a common exact key. For instance, customer household records from different databases can be joined on address when the addresses are not literally identical. When an address from one dataset is incomplete or inaccurate, there may be multiple records in the second dataset for which it is a candidate match. The fuzzy join accommodates this possibility.

A sort operation orders records by key and is often used prior to a key-based operation, like rollup or join, which acts on groups of records. A fuzzy sort may be used to order records prior to an operation such as a fuzzy rollup when individual records may be (probable or actual) members of multiple clusters. The notion of sort order and the action of sorting is extended by replicating individual records which are ambiguous members of multiple clusters and positioning them in each of their associated clusters in the final ordering.

Fuzzy data operations differ from conventional data operations in that in lieu of keygroups based on exactly matching keys, clusters are used. Clusters include the above example of retrieving Lesley when the key is Leslie. Clusters also include the example of classifying John Smith into the marketing department even though he does not exactly belong to the department because he only works in that department half of the time.

Figure 2B:
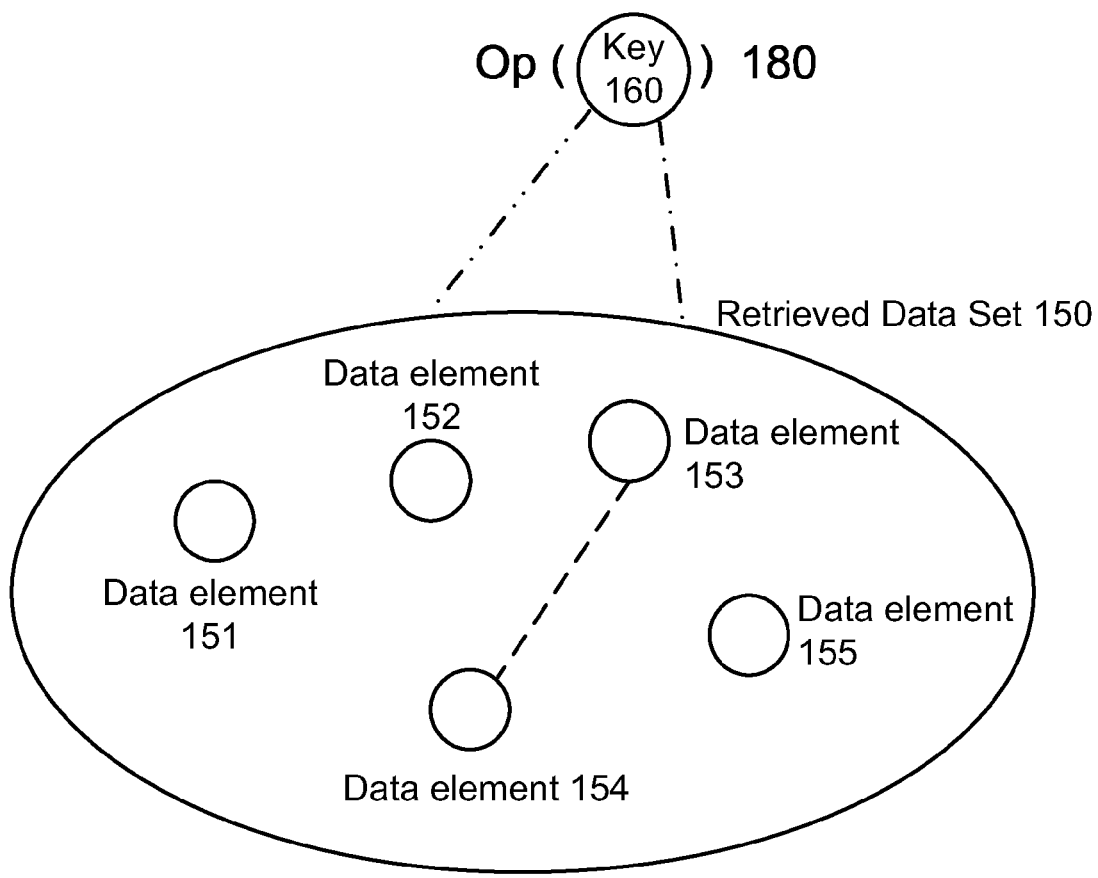
FIG. 2B is an example of an operation performed on a cluster.

FIG. 2B illustrates am exemplary fuzzy data operation. In this example, fuzzy data operation 180 operates on a key 160 and retrieves data set 150. Key 160 is a conventional key. The retrieved data set 150 includes 5 data elements, data element 151, data element 152, data element 153, data element 154, and data element 155. These five data elements do not match key 160. But nevertheless, they are retrieved by the data operation. This is where a fuzzy data operation differs from a conventional data operation. Given a key, a conventional data operation retrieves those data that match the key exactly. But a fuzzy data operation can retrieve data that do not match the key exactly.

Fundamental to the definition of the clusters underlying fuzzy data operation is the comparison of data in different records. A comparison test is used to determine which records belong to each cluster. In some arrangements, the comparison test is a scored function of selected field values taken from each record, and the quantified difference between two pieces of data (a key is a piece of data) may be a distance.

(a) Distance Between Two Pieces of Data

Differences between two pieces of data are often intuitively simple. For example, the difference between the names Leslie and Lesley is apparent and the difference between a full time employee and a part time employee is evident. However it is not always straightforward to quantify or measure differences between two pieces of data. Here we will briefly discuss two methods that can be used to measure a distance between two pieces of data. It should be understood that other methods quantifying differences between data can be readily developed based on the principles described below. Additional examples of fuzzy matching techniques and distance measures are described, for example, in U.S. Application Publication No. 2009/0182728, incorporated herein by reference.

(1) Distances Between Two Words.

A method of measuring the distance between two words (e.g., formed from a given character set), often referred to as the "edit distance," involves counting how many character operations it takes to get from one word to the other. In this example, a character operation involves a single character. A character can be encoded in any of a variety of ways. For example, it can be encoded using any single-byte or multi-byte encoding or code-point used to represent the character in a character set. The Levenshtein edit distance counts the number of character insertions, deletions and substitutions required to turn one word into another.

Figure 2C:
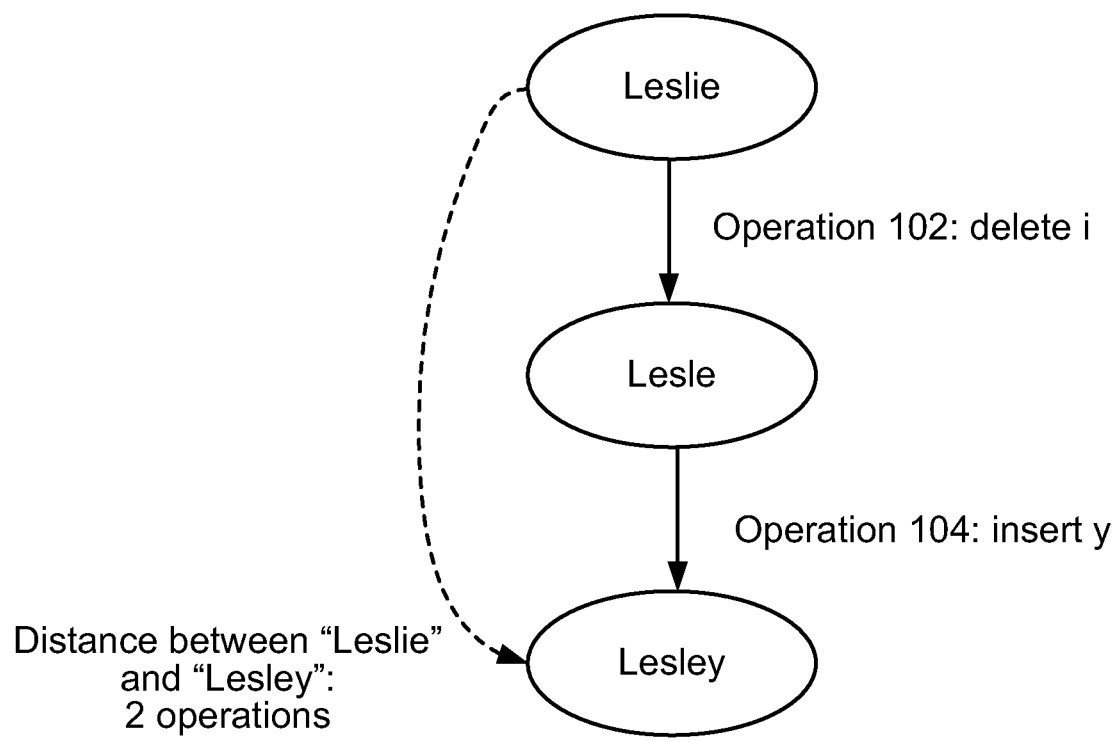
FIG. 2C, 2D are examples of distance calculation.

A limitation of the Levenshtein edit distance and its variants is that they cannot be used in the online fuzzy match context, that is, when you have a query word that has not been seen before and want to find matching variants in an existing reference set. A deletion algorithm (e.g., as described in U.S. Application Publication No. 2009/0182728, incorporated herein by reference) for computing variants can be applied instead. In this method, the distance between words is determined by counting the number of deletions required from each word to reach a matching word. FIG. 2C shows how the deletion distance between Leslie and Lesley is computed. Operation 102 deletes "i" from "Leslie" to obtain "Lesle". Operation 104 deletes "y" from "Lesley" to obtain "Lesle". The distance between "Leslie" and "Lesley" is 1+1 (one deletion from each word; alternatively, one deletion and one insertion acting on only one of the words).

In some arrangements, more refined scoring can be made by comparing the positions and relative values of deleted characters. This allows for weighted scoring, where different weights are applied for different kinds of changes. For example, a substitution may be less important than a transposition or substitution of an "m" by an "n" is less important than an "m" by a "k".

The deletion algorithm can be used for online fuzzy search of a reference dataset in the following way. A deletion dictionary is constructed from the reference dataset by forming every word obtained by deleting one or more characters, to as many deletions considered necessary, from each word in the reference dataset. (The number of deletions may be increased with the length of the word to allow greater variation.) Both the original word and the positions of deleted characters are recorded along with the word resulting from the deletions. When a search is made, the query word is processed to construct every word obtained by deleting one or more characters. Each of these words is looked up in the reference deletion dictionary to find the corresponding original word. (The record of the position of deletions can be used to score the match.) The matched original words may then be used in an ordinary exact search/lookup in the dataset. To reiterate, this method works even when the query word is a variant that does not occur in the reference dataset.

Another example is the distance between "Corp." and "Co.". From "Corp." to "Co.", two deletions in one word are needed, a deletion of letter r and a deletion of letter p. Therefore if the distance between two words is defined as how many deletion operations are needed (at a minimum) on each word to obtain a matching word, the distance between "Corp." and "Co." may be 2+0, even though "Corp." and "Co." are two interchangeable abbreviations for the same word "corporation." A conventional method that relies on exactly matching words will not yield satisfactory results in a case in which the data entered by a user uses "Corp." while the key used by a data operation uses "Co.". For example, a conventional search data operation that retrieves only data entries that match a key exactly will not yield ABC Corp. if the key used is ABC Co. Under fuzzy data operations, a fuzzy search can be constructed to return data entries that are within a certain distance of the key, e.g., 2+0 or better. Under such a fuzzy search, ABC Corp. may be returned as a match for the key ABC Co.

Alternatively, since these two words are interchangeable as synonyms, the distance between "Corp." and "Co." may be defined as zero. A fuzzy search can be constructed to return data entries that contain user-specified synonyms. This example showcases the complexities with which fuzzy operations may need to deal.

In the above examples, distances are computed based on operations such as insertion or deletion of a character, with both insertion and deletion counted as one operation. In other arrangements, distances can be computed based on weighted operations. The weighting can be used to bias one type of operation, for example, insertion, against another type of operation, for example, deletion. Alternatively, the weighting can be used to bias one individual operation against another individual operation. For example, an operation corresponding to deletion of a space may be weighted less than an operation corresponding to insertion of the letter z, to reflect the fact that an omission of a space is a common misspelling error while an insertion of the letter z in an English word is probably less a misspelling error than a true difference between two English words.

For example, the distance between "sunshine" and "sun shine" is one insertion of a space. The distance between "zinc" and "Inc" is one insertion of the letter z. These two distances are equal, one operation, if individual operations are not weighted in calculating the distance. When a fuzzy search operation is constructed to return any matches that are within a distance of one operation, a search by key "sunshine" will return "sun shine" and a search by key "Inc" will return "zinc".

Figure 2D:
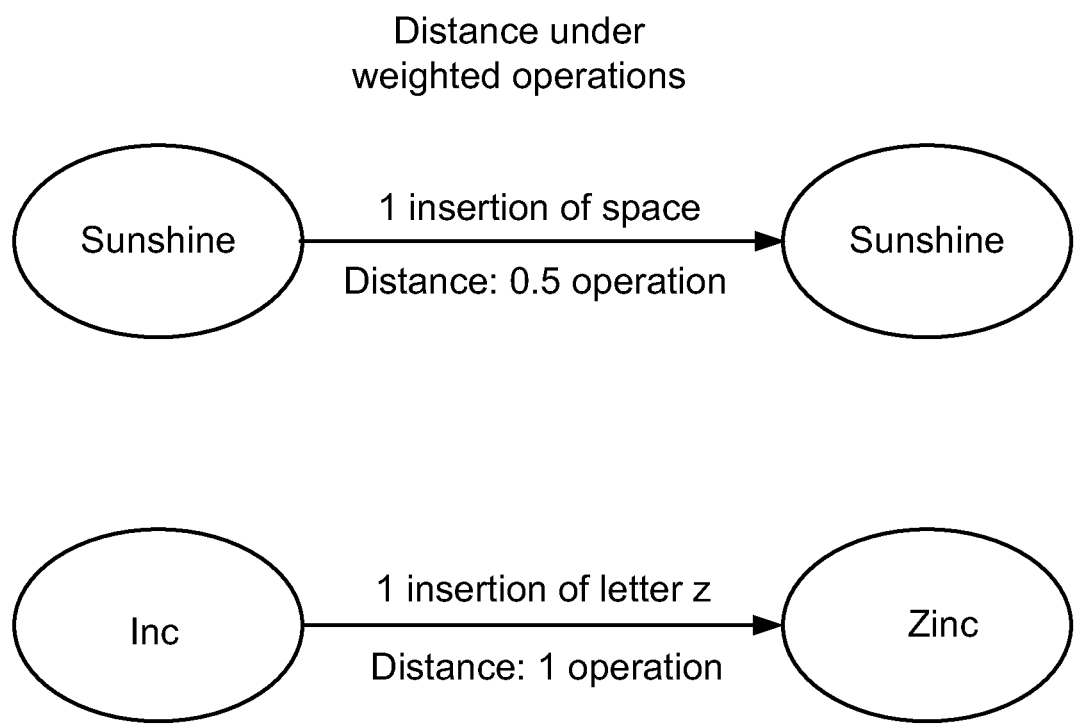

But if weighted operations are used, the two distances, the distance between "sun shine" and "sunshine" and that between "zinc" and "Inc", can be different. For example, an insertion of a space may be weighted by a factor of 0.5 to reflect the fact that an insertion of a space is more likely caused by a typo. An insertion of the letter z may be weighted by a factor of 1 to reflect the fact that an extra letter z is less likely added by mistake. FIG. 2D shows that when the operations are weighted as such, the distance between "sun shine" and "sunshine" is 0.5 operation while the distance between "Zinc" and "Inc" is one operation.

In an arrangement in which a fuzzy search data operation is constructed to return any matches that are within the distance of 0.5 character operations of the key, a search of key "sunshine" will return "sun shine". But a search of key "Inc" will not return "Zinc". In some arrangements, more elaborate weighting options may be defined.

(2) Distances Between Two British Postal Codes

Another application in which fuzzy matching is useful is working with a company's customer address database that contains duplicate records for the same household. The multiple entries for the same household may be caused by a typographical error in the zip code associated with the household, or may be caused by a misspelling of the name associated with the household.

Possible typographical errors may include omitting or inserting a space, omitting or inserting a letter, and mis-typing a letter. It is less likely that a user makes two typographical errors in the same zip code, though not uncommon. It is unlikely that a user makes three typographical errors in the same zip code, though not impossible.

Figure 3:
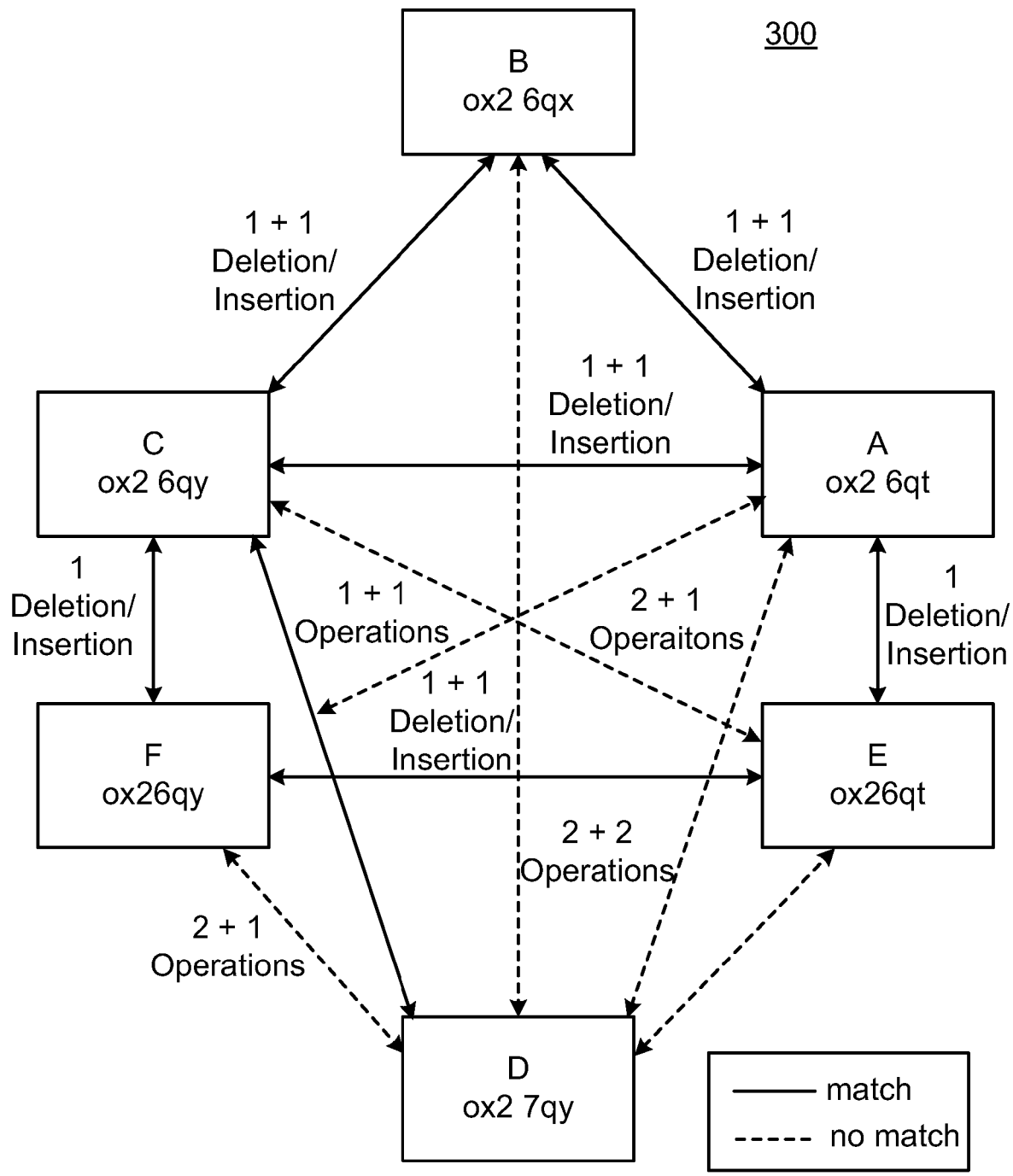
FIG. 3 is an illustration of fuzzy clusters.

FIG. 3 shows the possible duplicated records caused by typographical errors in a zip code. In customer address database 300, there are six entries under the name John Smith: John Smith ox26qt; John Smith ox2 6qt; John Smith ox26qy; John Smith ox2 6qy; John Smith ox2 6qx; and John Smith ox2 7qy. The distance between every pair of records is labeled next to the line connecting the pair of records.

Suppose that the company has decided that any record that contains a zip code within a deletion distance of 1+1 away from the zip code in a genuine record is most likely a spurious record, a record entered by mistake, and will be treated as a duplicate of the genuine record. Further suppose that the company has defined a fuzzy search to search for all the records that are within a deletion distance of 1+1 of the search key.

A word is a variant of another word if the former is within a specified distance of the latter. The latter is referred to as the primary. In the present example, the specified deletion distance is 1+1 (one deletion from each word). The distance information between each postcode in the customer address database 300 is listed in FIG. 3. Based on FIG. 4, we can determine the variants for each record, as shown in FIG. 4.

Figure 4:
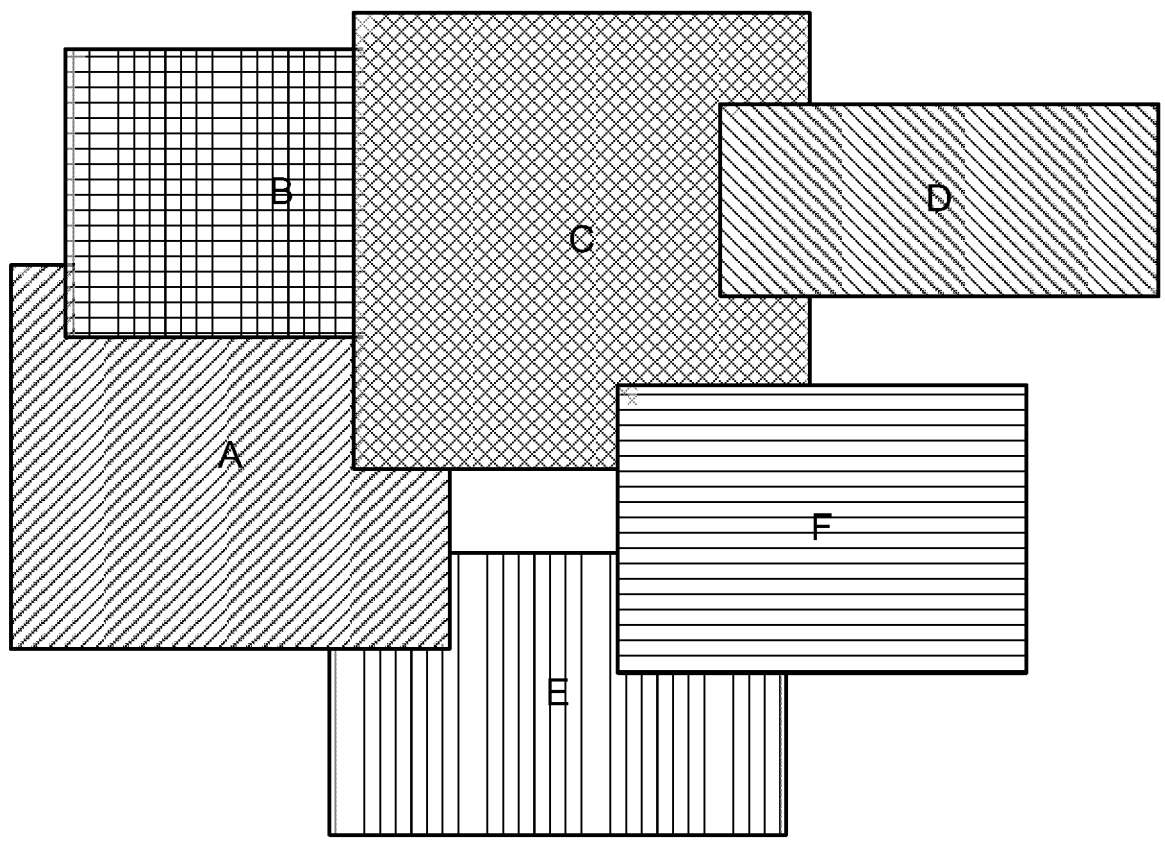
FIG. 4 is another illustration of fuzzy clusters.

FIG. 4 is a visualization tool and it is formed by representing each record with a box of a distinct shade and overlapping each record's box with the boxes of its variants. For example, record A's box overlaps with records B, C, and E's boxes because records B, C, and E are variants of record A. Record E's boxes overlaps with records A and F's boxes because records A and F are variants of record E.

In some instances, the company may know which record is a genuine record while in some other instances; the company may not know which one is genuine.

In a first example, the company knows that the genuine record is "John Smith ox2 6qy". Running the fuzzy search using "ox2 6qy" as the search key will retrieve the following two records: "John Smith ox2 6qt" and "John Smith ox26qy". The company will treat these two records in the same cluster as duplicates of the genuine record "John Smith ox2 6qy". The company may decide to eliminate these two duplicates or to group the three records together by assigning them a common key. This group is an example of a fuzzy cluster.

Fuzzy clustering is a data operation that groups together the data having keys that do not exactly match but are within a certain distance from each other. Fuzzy clustering may be related to fuzzy search as shown in the above example. When the genuine record is known as in the above case, a fuzzy search retrieves data that are within a specified distance of the genuine record. The retrieved data then form a fuzzy cluster.

In a case in which the company does not know which record is the genuine record, for example, both "John Smith ox2 6qt" and "John Smith ox2 6qy" may be true records, figuring out which records are duplicates of each other, thus creating a fuzzy cluster, cannot be carried out through a simple fuzzy search because there is no a priori guidance on how to group records together. Section (b) explains in detail a few approaches that can be adopted to generate fuzzy clusters in such cases.

(3) Other Examples of Quantified Differences.

Distance between two pieces of data is one example of a quantified difference between the two pieces of data. Differences between two pieces of data can be quantified in different ways.

In some arrangements, a scoring system may be developed to score a matching pair based on the similarity between the pair. The quantified difference between the pair can then be defined as the complement of the normalized matching score.

In scenarios in which there exists an uncertainty because of a pending outcome of an event, e.g., a lawsuit, the probabilities of a piece of data belonging to one category or another can be used to quantify distances between the piece of data and keys representing the category. The distance between the piece of data and the key representing a category can be defined as the complement of the probability that the piece of data will fall into the category if there are only two categories, or as the conjugate of the probability that the piece of data will fall into the category if there are more.

(b) Variant Relations and the Variant (Fuzzy) Join

Objects from respective data elements in respective datasets to be compared when those pairing data elements in a join operation can be defined as a piece, or a combination of pieces, of data. In a row of a table in a relational database, an object may be the value in a column, a part of a value (e.g. a substring), or a combination of values from more than one column. In a flat file dataset, consisting of a sequence of records comprised of fields, an object may be the value in one field, a part of one field or a combination of more than one field. In a document, this may be a fragment of text or a combination of disjoint fragments of text.

Consider a set S of objects $\{k\}$. Each object k in S has an associated set, possibly empty, of variant objects, called variants, $\{v\}$. The relation $$k \sim v$$

is read "v is a variant of k". In some arrangements, two objects are determined to be variants if their score under a function s(k,v) is below a threshold T $$s(k,v) < T.$$

(For some scoring functions, it may be convenient instead to exceed a threshold.) A distance between objects, say an edit or deletion distance for strings as discussed above, can be used as the basis for constructing a scoring function for comparing words or phrases.

The variant relation need not be an equivalence relation, that is, being symmetric and having the transitive property (k~k', k'~k"=>k~k"), but it sometimes is. The variant relation, even if it is not an equivalence relation, is presumed to be symmetric $$k \sim v => v \sim k,$$

i.e., if v is a variant of k, then k is a variant of v.

An exact (inner) join of two (or more) datasets A and B may be defined as a pairing of records (rows, documents, etc.), which contain identical objects $k_A$ in A, $k_B$ in B, such that $$k_A = k_B.$$

The objects $k_A$ and $k_B$ are called keys.

A variant ("fuzzy") inner join is defined in two steps. First a provisional pairing of data elements such as records (or rows, documents, etc.) is made. In one arrangement, $k_A$ in A is paired with its variants $v_{Bn}$ in B, $k_A \sim v_{Bn}$. The pair of records associated with $k_A$ and $v_{Bn}$ is then evaluated, $E(k_A, v_{Bn})$, to determine which pairs of records to keep. (In the exact case, all pairs are kept, so the matching and the scoring steps meld into the single comparison, $k_A = k_B$.) The evaluation operation generally involves comparison of further objects in the paired records beyond the objects used for pairing. In some arrangements, the evaluation operation produces a score which must exceed a match threshold to identify a match. Semi and outer joins are defined by analogy to the exact case with a null value specified for the opposing record when no matching records are found (or kept).

The simplest provisional pairing is given by $$k_A \sim v_{Bn},$$

that is, the set of variants of $k_A$ in B. This pairing ("matching") step is supplemented by an evaluation ("scoring") step which determines whether the proposed pairing is to be kept.

There is a hierarchy of extensions to the variant pairing, $k_A \sim v_{Bn}$. The first generalization is to extend the pairs $(k_A, v_{Bn})$ by appending the further pairs $(k_A, v_{Bnm})$, given by $$k_A \sim v_{An}, v_{An} \sim v_{Bnm}.$$

That is, $k_A$ is paired with the variants in B of the variants of $k_A$ in A. When the variant relation is not an equivalence relation, this reaches a larger set of elements in B. Note that this operation is not symmetric: there may be objects $v_{Bnm}$ in B which cannot reach $k_A$. That is, given $$v_{Bmn} = k_B, k_B \sim v_{Bi}, v_{Bi} \sim v_{Aij},$$

no $v_{Aij} = k_A$. This is because none of the variants of $k_B$ in B need have $k_A$ as a variant—at best, $k_B$ is only required to have a variant of $k_A$ as one of its variants.

Further extension to variants of the variants, and so forth, is possible. In particular, extending $(k_A, v_{Bn})$ by the pairs $(k_A, v_{Bnmj})$, where $$k_A \sim v_{An}, v_{An} \sim v_{Bnm}, v_{Bnm} \sim v_{Bnmp},$$

is symmetric in the following sense. Given an element $k_B$ in B (paired with $k_A$ by the above operation), i.e. $k_B = v_{Bnmp}$ for some n, m, p, there is an element $v_{Aijl} = k_A$, where $$k_B \sim v_{Bi}, v_{Bi} \sim v_{Aij}, v_{Aij} \sim v_{Aijl}.$$

In other words, the same variant matching procedure applied in reverse contains the reversed pair: every object in B reached from an object in A can in turn reach the original object in A through the same procedure.

The extension to more than two datasets may be defined by joining the datasets pairwise and taking the Cartesian product of the resulting pairs. Thus to join A, B, and C, $k_A \sim v_{Bn}$, $k_A \sim v_{Cm}$, $\Rightarrow (k_A, v_{Bn}, v_{Cm})$.

Higher order extensions are obtained by using the higher order extensions defined above (e.g. variants of variants) in a pairwise fashion. Optionally, in some situations, a variant relation between B and C may be required $v_{Bn} \sim v_{Cm}$ for some n,m.

The use of higher order variants may be required to establish this connection directly between B and C (the relation is of course already mediated through A).

As discussed above, one useful source of variant relations is to pair words related by an edit distance. If the edit distance considered between words is limited to one, this admits a certain set of pairings within a dataset as variants. For example, "Smith" would have "Smth", "Smith2" and "Smyth" as variants. "Smith20" is not a variant of "Smith", but it is of "Smith2", hence the variant relation of edit distance one is not transitive.

The variant join can be used when single words or whole fields can be used as variant keys. For example, searching a dataset can be formulated as a variant join using variant keywords. A query phrase is decomposed into a set of keywords, each of which is matched to its variants in an index of words from the target dataset. The index pairs a word with a record identifier (key) for each record containing the word in a given field in the target dataset. A list of corresponding record identifiers is obtained from the variant match of each keyword with the index, and these lists may be intersected to find records sharing one or more keywords. The list of returned records can be ordered by assigning a score to the combination of matching keywords. This score may take into account the relative frequency of each keyword in the dataset ("inverse document frequency"), the relative position of the keywords in the query phrase as compared with their position in the target dataset records (e.g. order, adjacency), or the absence of words from the query phrase. Keywords can also be associated with other measures of relevance to make scoring more discriminating.

The variant join can also be used as a lookup on a single word. For example, a customer in one dataset may be identified by firstname, lastname and address. This customer may be sought in a second dataset by lastname with the match to be corroborated by firstname and address. The match procedure is: from the lastname in the source dataset, use the set of variant lastnames in the target dataset to identify and retrieve the set of match candidates. These candidates are further compared on firstname and address to determine if the degree of agreement is sufficient to identify a match.

For example, suppose the record in the source dataset is
Paul,Smith,20 Walker Street
and the set of matching variants in the target dataset is (Smith, Smyth, Smithh).
The associated records in the target dataset are
1,Paul,Smith,20 Walken St
2,Robert,Smith,1532 East Grove Ave
3,P,Smyth,19 Western Ave
4,Pal,Smithh,20 Walker Street The corroboration algorithm might find records 1 and 4 are sufficiently close to be a match. These records might be returned by a lookup (search) or in a variant join (where two datasets are streamed against each other).

Alternatively, perhaps in the source dataset, the original "Smith" has a variant "Smith2" which has a matching record in the target
5,P,Smith20,Walker Street
"Smith20" is not a direct variant of "Smith" but can be reached from the variant "Smith2" in the source dataset.

Another use of the variant join is to define superclusters prior to clustering. This will be discussed below after clustering is defined.

(c) Clusters and Partial Membership

Many exact-key-based data operations require records be grouped into sets sharing a common key value. These sets are sometimes called "keygroups". For example, the rollup operation combines or aggregates data across the records in a keygroup to return a single record. Counts, totals, maximum or minimum values, vectors of values, deduplication to a unique value, etc., can all be computed with a rollup operation. Any operation which summarizes a group of records into a single record may be construed as a rollup operation.

Data-parallel processing, in which data is segregated into data partitions for independent processing, often relies on key-based partitioning to ensure that all records belonging to the same keygroup are present in the same data partition. Operations like rollup and join depend on this to produce the same result as they would in serial (non-parallel) processing.

The set of keygroups constitute a partitioning of the set of all records into disjoint sets: every record (object) is a member of one and only one keygroup. Clusters generalize the notion of keygroups to partitions involving overlapping sets, where membership is not determined by exact agreement of keys.

Consider the partitioning (decomposition) of a set S into a collection of possibly overlapping sets {C}, called clusters, of objects k, each with weight w(k,C). An object k may be a member of more than one cluster C, and, if so, its cluster membership is said to be ambiguous or partial. The weight w(k,C), assigned to k in C, quantifies the "partial membership" of k in C and is sometimes called the measure of ambiguity. The cluster C may be denoted as the set of pairs C={(k,w(k,C))}. If w(k,C)=0, then k is said to be "not a member of C". If w(k,C)=1, then k is "definitely a member of C". For fixed k, the sum of the weights over C is equal to 1, corresponding to definite membership in S, $$\sum_C w(k, C) = 1.$$

The assignment of weights is associated with a rule R and may be labeled by R. A given set S typically admits more than one partitioning into a collection of clusters and more than one weighting assignment for each object k under different rules. In general, weights associated with different rules cannot be combined.

The complement of a cluster C={(k,w(k,C))} is defined to be the set {(k,1−w(k,C))}. In particular, the complement contains, with weight 1, the objects not in C. If the collection of clusters {C} do not span S, or the sum of weights for k over C is not equal to one, the complement of the union of the {C} in S is presumed to be adjoined to the collection.

Two clusters can be combined into a single cluster, thereby coarsening the partitioning, by summing their weights $$C_1+C_2=\{(k,w(k,C_1)+w(k,C_2))\}.$$

A cluster can be decomposed into further clusters by reversing this process, allocating the weights for each object among the new clusters, so the sum of new weights equals the original weight. Objects can be removed from a cluster, for example after applying a selection criteria, by subtracting their weight.

In some situations, when the weights satisfy $0<=w(k,C)<=1$, the weights may admit an interpretation as "the probability that k is a member of the cluster C in 5," but in general the definition of clusters is non-statistical The possibility of negative weights and weights greater than one is not excluded, but the sum of the weights for fixed k must be one.

While combinations like $C_1+C_1$ can in principle be formed, they correspond to constructing clusters containing multiple copies of objects, as reflected by the value of the maximum possible weight for an object (e.g. two in this case). The condition that the sum of the weights be one for each object assumes that only one copy of each object is present in the set S. If this is not the case, the value of the sum of the weights may be changed accordingly. In general, there is nothing to preclude the total weight from varying by object.

A cluster with partial membership is similar to the notion of a fuzzy set since it can be described as a set of objects with a membership function assigning weights to each object in the set. However, here the emphasis is not on fuzzy sets in isolation but on clusters as elements of a partitioning. In particular, the weights are a property of the partitioning and not of the object within the cluster in isolation. The weight assigned to an object within a cluster is affected by the possible alternative assignments to other clusters. The focus shifts from the membership function within a cluster to the function allocating membership for an object across clusters.

Clusters with partial membership arise naturally in a number of situations. In simplest terms, partial membership is a consequence of ambiguity in the assignment of an object to a cluster. If there is an exact key, there is no question to which keygroup an object belongs. If membership is based on a piece or combination of pieces of data which need not agree exactly, membership decisions may not be so clear cut.

The following are examples of broad data quality issues which can lead to partial membership.

Data may be inherently ambiguous relative to the clustering rule. Sometimes clusters overlap for the simple reason that their definition does not presume exclusive membership. Consider an employee who works for two different departments in a company. If a list of employees is clustered by department, the employee properly appears in two clusters, as this reflects the true state of affairs. In this case, partial membership can be set to reflect the portion of time the employee works for each department. This in turn reduces the opportunity to draw the false conclusion that there are two distinct employees having the same identifying information in the separate departments.

Data may be imperfect. Variant words in fields may make identification ambiguous. When assigning addresses to households, the house number on one address record may be 12, yet there is no house number 12 on the street. Instead there are house numbers 1, 2 and 21. A weight of 0.3 on the first two and 0.4 on the last might reflect the slightly greater chance of a transposition error over an insertion error.

Data may be incomplete. A piece of information necessary to make a decisive assignment to a cluster may be missing. For example, consider the problem of assigning address records to households. Each unique house number, street, city, postcode combination is assigned a unique household number. The clustering algorithm may be tolerant of variant spellings of the street and city names, so it is not necessary for every address be identical to be assigned to the proper household. However, if the house number is missing from an address, there is not sufficient information to make a definitive assignment. In order to preserve as much information as possible, the incomplete record may be partially assigned to each household consistent with the available information. If there were five possible housenumbers, then the weight in each household cluster might be 0.2, reflecting the equal likelihood of each house number. In a different context, consider a dataset consisting of the outstanding debt on accounts labelled by company name. A bank wants to aggregate this data to determine the total outstanding debt associated with each company by country. Among the company names are "ACME SERVICES LIMITED (AUSTRALIA)", "ACME SERVICES LIMITED (CANADA)" and "ACME SERVICES LIMITED". Each of the first two go into separate clusters, but the third is an equal match to each of the first two and lacks a country identifier. Putting the third company in each of the first two clusters with weight 0.5 reflects the incompleteness of the company information.

Data or classification may be inherently uncertain. Cluster membership may be based on the outcome of future events. Consider a dataset containing a list of assets and their values. The assets are to be clustered by owner. However a lawsuit is pending on the ownership of a particular asset. Placing it with either possible owner may be a lost bet, yet the asset cannot simply be ignored. Assigning the asset to each owner with a partial membership reflecting the current state of knowledge of the expected outcome of the lawsuit gives the fairest and most informative disposition of the asset consistent with current knowledge.

(d) Clustering

Clustering is the act of grouping records into clusters, based on cluster membership criteria. In the exact case, an object from each record (a key) is exactly matched with a corresponding object in other records and a cluster, or "keygroup", is the set of records sharing a common key. In the fuzzy case, cluster membership may be determined by a variant relation between objects in each record. (Yet more general cluster membership criteria are possible.) To avoid having to compare all records in a dataset to each other, a supercluster key is used to divide a whole set into subsets, and cross comparison is restricted to records within a supercluster.

In many cases, superclusters are defined by exact keys, for example, a postcode. The variant join enables a supercluster to be defined using variant objects. For instance, a supercluster may be defined as the set of records containing all postcodes which are variants of a given poscode. For example, given the UK postcode OX2 6QY, the variant postcodes OX26QY and OX2 6QT are both edit distance one variants, while the latter is itself a valid postcode. Admitting records from each variant postcode as potential matches enables the cluster results to be tolerant of errors in the postcode.

In another arrangement, superclusters may be formed by taking a fragment of a word from a chosen field in each record (say from either the longest or most significant word, based on relative frequency) and using the variants of this fragment to identify the supercluster. This is appropriate when for two records to be members of the same cluster, they very likely share particular words, but those words need not be direct variants, let alone equal. By considering variant fragments as the supercluster key, records are admitted for which the remainder of the word differ more than accepted as a variant. A more thorough comparison of the full word and other objects in each record is needed to determine cluster membership.

For example, when comparing German street names, the street Graf von Stauffenberg Strasse may be required to contain Stauffenberg in some form. In sample data, the observation is made that Strasse may be abbreviated and concatenated to the preceding word to give entries like Graf v. Sauffenbergstr. A supercluster defined by edit-distance-two variants of the first five characters of the longest word in each streetname would include both "stauf" and "sauff". Records containing both Stauffenberg and Sauffenbergstr would be included for comparison within the supercluster and a suitable scoring function would assign them to the same cluster. By contrast, a supercluster based on edit distance two variants of the longest word would isolate these two streetnames into separate superclusters, and they could not be clustered together.

Judicious choice of superclusters is important for the performance and accuracy of clustering methods. For example, if superclusters are too big, many unrewarding comparisons may be made which may cause performance to suffer. Alternatively, if superclusters are too narrow, acceptable matches may be missed, and accuracy may suffer.

(e) Partial Membership

Suppose a data entry operator is filling in forms in an application to add new customers to a database. As names are entered in the form, the application validates the entries against a reference lists of names. Using fuzzy search with the deletion algorithm as described above, the application can detect a variant spelling of a name and return a list of alternates from the reference list. Suppose, the operator enters "Jame" in the first name field. The application might return the following list of alternates in alphabetical order (together with the count of records in the database containing that name)

Jaime 250
James 13359
Jamie 339
Jane 9975

These all differ from Jame by one insertion and/or one deletion and are candidate alternatives.

To improve the usefulness of the list to the operator, the alternatives can be prioritized using any of a variety of models for determining the measure of ambiguity. Three exemplary ways to quantify the ambiguity are: 1) equipartition, 2) statistical frequency, and 3) error model.

In the equipartition approach, each alternative is treated as equally likely. Here, the likelihood that Jame is any one of the alternatives is one-fourth. An alphabetical list of alternatives typically indicates an implicit equipartition approach.

In the statistical frequency approach, a reference set, like the database table itself, is used as a source of observed frequencies for each name. If the list above is sorted in descending order by the count shown, then the most likely correction is James, followed by Jane, etc.

The third method of error model is based on the observation that certain kinds of errors are more likely than others, depending on the language and the mode of entry, among other things. For keyboard entry by a skilled operator, it may be that a substitution error may be more common than skipping a character or inserting an extra character. Similarly, for an operator recording a spelling given by a customer over the phone, transcription errors involving phonetically similar letter names are likely to be more common than other kinds of errors. In either case, here, Jane would be the most likely correction. To use this method, a model classifying the possible errors and their relative importance can be developed and applied. Such a model could be produced from statistical analysis of the WFS (word frequency significance) file, introduced in U.S. Application Publication No. 2009/0182728.

Suppose an application matches records containing customer address, here referred to as query addresses, to a master customer address table to retrieve an existing household key, if a match is found, or to create a new key otherwise. Query addresses may not match addresses in the master customer address table exactly, so a fuzzy match can be used. Furthermore, the query addresses may be incomplete or inaccurate. This means that more than one existing address may be a match to the query address. To quantify the quality of the match, it is useful to have a measure of the ambiguity of the match.

For example, an address may have no house number while the master customer address file has multiple entries with the same street address (ignoring the house number). Suppose the query address is Lower Street with a particular town and postcode. A fuzzy search on postcode returns a list of prospective address records, having the same or a variant postcode. The postcode, town, street, and house number fields on the query address are compared with each corresponding field of the prospective addresses and scored, as part of the fuzzy match process. Suppose, in this example, there are two master records which exactly match the street, town and postcode of the query address: 2 Lower Street and 3 Lower Street. Each prospect has equal quality of match with the query record, and this cannot be improved upon with the existing data because the house number is missing on the query record. Under the equipartition measure, there is an equal likelihood that the actual match is to either household.

Alternatively, suppose the house number is populated but invalid, failing to correspond with any existing address. Suppose the query address is 12 Lower Street, but validation against a reference Postal Address File (a list of all valid addresses available from the Postal Service) shows there is no house with that address. The matching addresses in that postcode are 2 Lower Street and 3 Lower Street as above. An error model for address entry might prefer the match of 12 to 2 over a match of 12 to 3. This would give a biased weighting of the likelihood of the match to favor the match with address of 2 Lower Street.

Finally, if the house number on the query record is populated and a valid postal address, then an error model for address entry could quantify the likelihood that the address is new versus an error of an existing address.

(f) Quantifying Data Quality

A measure of ambiguity is also applicable in the wider context of measuring data quality. Businesses and organizations are concerned about the quality of their data, particularly their master data, but currently it is difficult to quantify any but the most obvious data quality problems. Of the short list of data quality problems given above, some data quality measuring systems (e.g., see U.S. Application Publication No. 2005/0114369, incorporated herein by reference) mainly address one directly: data validity. Data can be exhaustively cataloged and checked for validity against its data type and against a variety of user-defined measures of validity, including lists of valid values.

Evidence of incomplete entries within fields of records can be inferred from the number of unpopulated (blank or null) entries, but this does not quantify the importance of the missing information. Consider the case of a master customer address list. If the city is missing from a customer address entry, but there is a valid zipcode and street address, does this add any ambiguity? Or, can the address effectively be completed from the information on hand, perhaps using a reference set like a Postal Address File? What if an address is missing a house number? How many houses share the remaining address? Some data quality problems can be fixed with data cleansing (missing city), others cannot (missing house number). A measure of the intrinsic ambiguity present in the data is needed.

By comparing each address entry to a reference dataset, a measure of the ambiguity in the entry can be computed. An ambiguity report might include the fraction of entries with no ambiguity. For entries having ambiguity, a report might show a histogram plot of the number of entries having K alternatives (or a specified bin/range of alternatives, also called "variants"). There might also be a list of the first N entries with the greatest ambiguity, where N is a user-specified number of entries. One summary statistic quantifying the ambiguity associated with incomplete data for the entire dataset can be constructed from the mean and standard deviation of the number of alternatives per entry.

If a statistical frequency measure of ambiguity is applied to quantify the likely completions of an address, then interesting measures are: a) histogram plot of number of entries with K alternatives, b) list of N entries with the greatest range of alternatives, with histogram plot of distribution of frequencies of the alternatives, c) count and list of N entries with the strongest association to a single alternative, d) mean and standard deviation of number of alternatives.

Analogous measures apply to the error model measure of ambiguity.

The data quality problem of variant entries, where the entry in a field is not the one intended, is similar to both the problem of invalid values and the problem of incomplete information. At some level, saying an entry is not the one intended is to assert that it is invalid for a specific, though not necessarily articulated, validation criterion. Validation of a street name might be defined by comparing the street name to that contained in a reference Postal Address File. Alternatively, in the absence of a reference dataset, validity might be inferred from the relative frequency of associated variant matching entries. If an entry occurs with relatively high frequency and there are no high frequency alternatives, it could be taken as valid. If it occurs with relatively low frequency and there is a single high frequency alternative, it may be taken as invalid. If there are multiple high frequency alternatives, the correction to valid data may be ambiguous and may be quantified similarly to how it would be were the data missing.

Suppose a field has a value outside an enumerated set of valid values. For example, the gender field is G instead of M or F. An equipartition measure of ambiguity would say there were 2 alternatives for the entry. A frequency measure would still show 2 alternatives but might contain a bias to either M or F. In a simple enumerated case, when there is no variation in the number of alternatives, an ambiguity measure for the dataset is formed from a simple product of the ambiguity measure per entry times the fraction of invalid values.

When there is variation in the number of alternatives, as there would be if, say, a street name were misspelled, then the measure of ambiguity will help to quantify the ambiguity present in the data. The frequency and error model measures should give the most reliable results for variant spellings. As with incomplete information, the measure of ambiguity ultimately reflects how much the dataset could be improved by cleansing and how much uncertainty would still remain.

Data entered in the wrong fields could also be quantified in a similar way. Here, there may be the additional ambiguity regarding whether the data placement is in fact wrong. In the case of a surname having a common first name value, it may not be clear whether one ordering over another is correct. Knowing how often there is a common first name in the surname field (or vice versa) helps to bound how serious the problem of wrongly ordered names might be. If an accurate reference (or other validator) is available, then a measure of the error rate could be obtained. It may be that out of a dataset of 100,000 entries, there are 500 where there is a surname which is a common first name, but only 25 of these are in fact wrongly ordered. The error rate is then 25/500=1/20. Even in the absence of a measured error rate, knowing that there are only 500/100,000=1/200 entries which are vulnerable to the problem improves one's confidence in that data.

Other interesting checks for the name fields would be to know when: a) both forename and surname are common first names, b) when forename is a common last name while surname is a common first name, c) when forename is a common last name while lastname is as well. A frequency measure of ambiguity derived from a reference dataset of names (perhaps the dataset itself) could be used to compute a likelihood that the ordering is correct. For example, consider the name David Paul. From the probability that David is a first or a last name, and similarly for Paul, the likelihood that David is a first name can be computed.

Some reorderings among fields, for example in addresses, are wrong relative to a chosen reference dataset but are not wrong per se because the standard which specifies ordering is either weak or non-existent. Here a measure of ambiguity of a particular address ordering compared with the reference dataset could be used to show that different orderings are not a serious data quality problem because they do not introduce ambiguity of association into the data. This is important input to the decision of where to invest effort to improve data quality.

To quantify the amount of reference data present in free text fields, one could decompose the free text into words which are used in a fuzzy search against chosen reference datasets. For example, suppose a company expects that product ids are being stored in comment fields of invoices. By using each word in the comment field to do a fuzzy search against the product id table, the number of product ids present in the comment field can be found. More generally, each word could be searched against the WFS file (ref. other patent) to determine all of the fields in which it or its variants occur, and with what fractional rate. This gives a fuzzy cross-correlation of data in one field against data seen in others. (This approach could also be used to identify data that has been placed in the wrong field.)

The several referential integrity problems can all be quantified. First a corroboration measure can be defined as the fraction of exact key pairs for which the linked data is not in fact correctly linked. Corroboration of this kind can only be made when comparable fields exist on both sides of the link (or can be brought to the point of linkage through additional joins). Typically this is a comparison between similar fields, like customer name and address, that are held in more than one database where a linking key has been established between the databases. This situation arises when comparing data held in a data warehouse with data in the source systems that populate the warehouse. If different source systems hold conflicting information or if they are updated inconsistently, the data warehouse may similarly be in conflict with one or more source systems. Validating a data warehouse for consistency with its sources would provide a new and important check on enterprise data quality.

A second check is to look for missing and orphaned links, that is links where there is no record on the other side of the link. A fuzzy search can determine whether there is another record which should be a linked (missing link) or not (orphaned). A measure of the fraction of each of these conditions is important. If the match to a record on the other side of the link is ambiguous, then a measure of ambiguity can quantify it. This forms the basis of a data cleansing operation to repopulate the links where this can be done uniquely and identifies which links require further investigation because they are ambiguous. (Below the possibility of partial membership will be considered.)

When two datasets contain related information but no key relation exists between them, a fuzzy search or join between the datasets will find prospective links between the datasets. A measure of the ambiguity of each prospective link will indicate how clean the mapping is between the datasets. This would be very useful for example when combining the master reference data, like customer name and address, of two companies when they merge. Equally, it can be used to merge the reference data of different parts of a business. This would be an important early stage in the arrangement of a master data management solution. Part of the gap analysis in creating a master data management solution is to determine the quality of the alignment between existing reference datasets used by different systems. The initial alignment between the systems is a by-product of this analysis. Having a measure of ambiguity then helps to quantify the additional work it will take to reconcile the systems.

(g) Clusters and Partial Membership (1) Creating Fuzzy Clusters

As we mentioned before, when there is no a priori guidance on how to coalesce elements into groups, a principle or an algorithm is used to identify groups. This is of practical importance because in real cases, which element should serve as a core element to attract other elements in order to form a group often is not clear. For example, in the above example of the duplicate records in a customer address database, sometimes it is not possible for the company to tell which record is the genuine record. The following discussion proposes a few algorithms that can be used to form fuzzy clusters of records, within which the pieces of data will be regarded as associates of each other.

In the above mentioned customer address example, there are six records associated with "John Smith": (A) John Smith ox2 6qt; (B) John Smith ox2 6qx; (C) John Smith ox2 6qy; (D) John Smith ox2 7qy; (E) John Smith ox26qt; (F) John Smith ox26qy. Without knowing which record(s) corresponds to a real household/real households, the company may be interested in grouping the above records into two or three clusters with each cluster representing a real household. In this way, the company may be able to reduce mail volumes by reducing mail sent to spurious mailing addresses.

Figure 5:
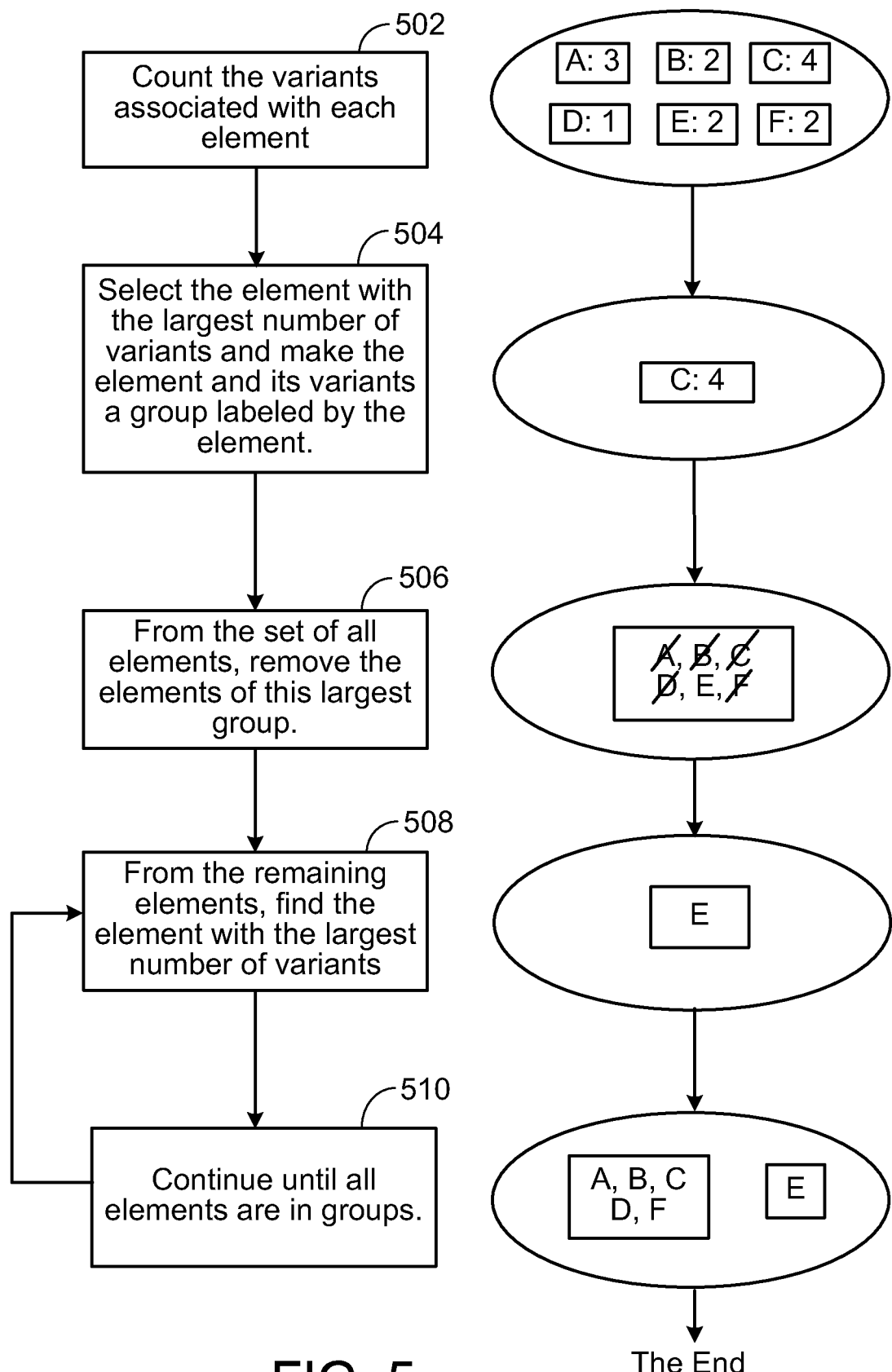
FIG. 5 is a flow chart of how to generate fuzzy clusters.
Figure 6:
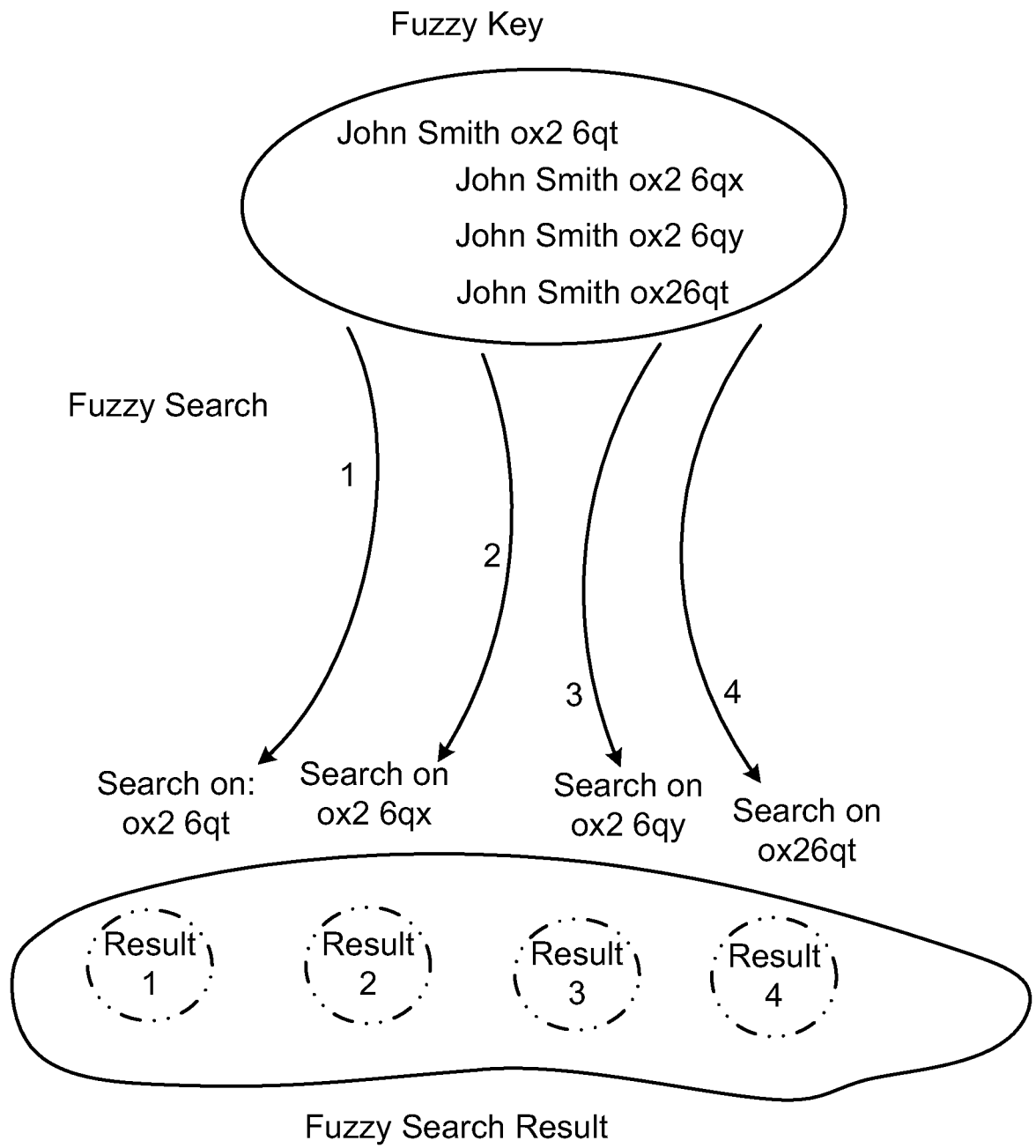
FIG. 6 illustrates an example of fuzzy search.

One algorithm that can be used to create clusters is finding the largest disjoint subsets containing the largest number of elements that are within a specified distance. This approach is explained with reference to FIG. 5. The steps involved are illustrated in the flow chart. FIG. 5 also uses the above customer address database example to elaborate the algorithm. The results from each step are demonstrated to the right of the corresponding step. In this instance, the specified distance is two operations.

In referring to the flow chart in FIG. 5, the first step to create clusters out of the largest disjoint subsets is: for each element, count (502) the variants of that element. As defined above, a variant of an element is an element that is within a specified distance from that particular element. In the customer address example, for record A, there are three records (B, C, and E) that are within the distance of two operations. For record B, there are two records (A, C) that are within the distance of two operations. For C, there are four; for D, there is one; for E there are two; and for F there are two.

Then, select (504) the element with the largest number of variants and make the element and its variants a group labeled by the element. In the customer address database example, record C has the largest number of variants, 4. Record C and its variants (A, B, D, F) form the first cluster.

Next, from the set of all elements, remove (506) the elements of the largest group. In the customer address example, this leaves only record E.

Then in the remaining elements, find (508) the element with the largest number of variants. This step will generate a second cluster. In the customer address example, the second cluster has only one element, E, in it.

Continue (510) until all elements have been grouped in a cluster. In the customer address example, there is no need to go further because every element has found its group.

This algorithm generates two clusters in the customer address database example, a group that consists of A, B, C, D, F and a group that consists of solely E. The company may treat the records contained in each group as duplicates of each other and consolidate the records to reduce mail volumes.

Some adjustments may be added to the above algorithm. For example, both records A and F are of the same distance from C and E. In the above algorithm, assigning records A and F as duplicates of C is an artifact of the process and does not necessarily indicate that the records A and F are closer to C than to E.

One adjustment may be to note the uncertainty on the expressions of the clusters. For example, an expression C 5–2 can be used to represent the cluster of C, which includes record C and its variants, with 5 indicating the total number of records and –2 the uncertainty. An expression E 1+2 can be used to represent the cluster of E, which includes record E and its variants with 1 indicating the total number of records in that group and 2 the uncertainty. A positive uncertainty of a cluster reflects that there are elements that are grouped elsewhere may belong to this cluster. A negative uncertainty of a cluster reflects that elements in this cluster may belong to another group.

Another adjustment may be to add A and F to the cluster of E. Thus, group C has records A, B, D, F and group E has records A and F. However, because the records A and F belong to two groups, the total number of records in all of the groups is 8, two more than the true total count of records. To conserve the total count, partial membership may be used.

A second method of constructing fuzzy clusters is appropriate when clustering data on multi-word fields, like company name, where the variation between records is assessed by scoring phrases rather than single words (or entire fields like a UK postcode). Phrase scoring takes into account not only variant spellings of words, but also word order, missing words, and insertions between words that change the detailed word sequence. For example, given a company name Bank of America, the following illustrate four types of name variations that need to be identified and distinguished:

1) Bank of Amrica (fuzzy match of a word)
2) America Bank (word order, missing word)
3) Bank America (missing word)
4) Bank of South America (inserted word)

As an example of clustering on a phrase, suppose a bank is attempting to identify all of the accounts that belong to the same legal entity in a master customer list. A legal entity is to be identified by the company name, address and company registration number, if there is one. The principal field used for clustering is company name as it is highly correlated to the legal entity and is always populated. Address is a secondary field used to distinguish companies which accidentally have similar names. Company registration number is expected to be definitive for legal entity identification, but it is insufficiently populated to be used alone.

The fuzzy clustering operation begins by identifying a super-cluster key which divides the original dataset into smaller subsets, appropriately sized to compare allow comparison of all elements for cluster membership. Records with differing super-cluster key will by construction be in different clusters. For geographically based data, like addresses, the postcode is often an appropriate super-cluster key. Records having a matching variant postcode may be included in the super-cluster. Records with non-matching postcode are expected with high probability to belong to distinct clusters, so to improve performance, they are excluded when computing clusters by introducing the super-cluster key.

Within each super-cluster, data is sorted in descending order by length of the company name field and in ascending order by company name to present the longest names first to the clustering algorithm in a reproducible order. The first record in a super-cluster group is made the primary record of the first cluster. Each subsequent record, called here the current record, is compared to the primary record of each existing cluster by scoring the company name of the current record against the company name of the primary record of the cluster. If the score is above a suspect match threshold, the cluster is added to a list of suspect clusters for the current record. After comparing the current record with all of the existing primary records, if the suspect list is empty, the current record is made the primary record of a new cluster. If the suspect list has only one entry, and the score is above a match threshold, the current record is added to the cluster on the suspect list. If the suspect list has more than one entry, the company name on the current record is scored against every record in each of the clusters on the suspect list. The current record is added to the cluster where it has the highest score over the match threshold. If there is an equal score over the highest score with records in more than one cluster, the current record is added to the first such cluster. If no score is over the match threshold, the current record becomes the primary record of a new cluster.

This algorithm has two important features. Because ambiguous matches to multiple clusters are decided in favor of the first matching cluster, some clusters are relatively overpopulated with ambiguous members. Also, the order in which records are presented to the algorithm affect specific membership decisions. The initial sort on the length and value of company names is intended to ameliorate this by establishing a fixed order of names. The notion of partial membership, discussed below, gives a richer solution which more accurately reflects the ambiguity of cluster membership.

An example of ambiguous membership arises in the following set of company names:
  ACME Services Australia Limited
  ACME Services Canada Limited
  ACME Services Limited
Under a particular scoring, the score of ACME Services Australia Limited with ACME Services Canada Limited is 0.65 which is below the match threshold of 0.75, and the records are placed in separate clusters. ACME Services Limited has an equal score of 0.95 to both clusters. It becomes a member of the ACME Services Australia Limited cluster since it is encountered first.

(2) Partial Membership

In the first example in the previous section, records A and F belong to both the clusters C and E. If every appearance of a record in a cluster is counted as one, the total count of records in the clusters C and E is eight, five in the group C (C, A, B, D, F) and three in the group E (E, A, F), even though there are only six records. In this case, partial memberships can be used to preserve the total count. If a piece of data belongs to more than one group, an appearance of that piece of data is counted as less than one, that is, a fractional number. But the sum of all the appearances of that piece of data should still be one to conserve the total count.

In some arrangements, a partial membership of an element in a group may be defined to reflect the likelihood of the element belonging to that particular group, using, for example, the measure of ambiguity described above.

For example, suppose record A has a probability of 40% belonging to group C and a probability of 60% belonging to group E. A partial membership of 0.4 can be assigned to record A in group C and a partial membership of 0.6 can be assigned to record A in group E.

Similarly, suppose that record F has a probability of 10% belonging to group C and a probability of 90% belonging to group E. A partial membership of 0.1 can be assigned to record F in group C and a partial membership of 0.9 can be assigned to record F in group E.

With the partial memberships assigned to record A and F, the total count is the sum of the count of group C (1+1+1+0.1+0.4=3.5) and the count of group E (1+0.9+0.6=2.5), which is 6. Therefore, the total count is preserved.

Since the origin of partial membership is uncertainty over the membership of particular elements, the total membership of each group is only known with a degree of uncertainty, i.e., a margin of error. The total count of each group may be expressed as the sum of the memberships, whole and partial, adjusted by the margin of error. This margin may be indicated by the maximum and minimum bounding values obtained by assuming all uncertain decisions about membership fall either to inclusion or exclusion. These correspond to the worst case scenarios over distribution of the members among clusters. Here, with bounding values, total membership in C would be 3.5 (3, 5): this is read as saying the expected number of members of C is 3.5 while C has at least 3 members and at most 5 members. Similarly total membership in E would be 2.5 (1, 3): the expected total membership of E is 2.5, but at least 1 member and at most 3 members.

The bounding values belonging to different clusters are correlated, though the notation used here does not indicate it. Correlations among different records in the dataset are possible and should be taken into account when computing bounding values. For example, it is sometimes possible to know (with certainty or other probability) that A and F are not in the same cluster, without knowing to which cluster they belong.

In the second example above, the quality of clustering can be enhanced by associating to each cluster all records which match the primary record above the suspect threshold, especially when there is an ambiguous match or suspect match to more than one cluster. The quality of the match should be recorded against each suspect record and quantified with a measure of ambiguity. The partial members would in one arrangement be held separately from the full members, labeled with the measure of their partial membership. For example, the members of a cluster might be listed in descending order of partial membership (with full members having partial membership of one).

A rule label should be attached to each record as well which can be used both to link records whose partial memberships were determined together and to identify the rule, event or decision which determined the partial membership allocation. This rule label will be useful when adjusting partial membership when combining records with differing partial membership.

While, from one perspective, partial membership reflects ambiguity arising from uncertainty of membership, from another perspective, partial membership is simply allocation of membership among multiple clusters, as in the example of an employee working for two departments. In the uncertain case, a change in the state of knowledge is expected to change the membership allocation. Alternatively, the partial membership may simply be accepted as definitive. There is no cost to accepting the fractions as real.

When partial memberships represent the likelihood of an element belonging to different clusters, a partial membership is always non-negative and the sum of the partial memberships of an element belonging to different clusters should one.

However, a partial membership may be negative in some arrangements. But the sum of the partial memberships of an object belonging to different clusters must still be constrained to be one.

In some arrangements, a partial membership of an element can be defined as a function of the distance between the element and the primary or a function of a matching score between the element and the primary. One method of constructing partial membership out of fuzzy scores is through a measure of ambiguity, as described above. Different fuzzy scores reflect different distances between an element and the primary, and therefore different measures of ambiguity. Please note that fuzzy scores reflect the resemblance between variants and the primary, and often are not the same as probabilities.

(h) Fuzzy Data Operations (1) Filtering in the Presence of Partial Membership

Often it is useful to apply a selection criterion to isolate a subset of records sharing a common property. For example, in a dataset of international records, the records from a particular country may be selected. The selection operation (sometimes referred to as "filtering") is not considered key-based as the field(s) used in the expression determining selection need not be keys. When records are allowed to have partial membership in multiple clusters, filtering may cause some of the partial members to be dropped. The result is the total membership allocation associated with a record across the selected subset may be less than unity. The explanation for this is that the total allocation measures membership in the selected subset against the alternative of being outside the selected subset.

Suppose that ACME Services Limited has a 0.5 allocation to the group containing ACME Services Australia Limited and a 0.5 allocation to the group containing ACME Services Canada Limited. The total allocation for ACME Services Limited across the whole dataset is 1.0. If a filter is applied to keep only records associated with Canada, ACME Services Limited will have total allocation 0.5 in the resulting dataset. This indicates that ACME Services Limited has 50% chance of being in the Canada subset against a 50% chance for the alternative of not being in the Canada subset.

(2) Parallel Partitioning by Key and Partial Membership

In parallel processing records may be allocated to different processing partitions based on the value of a key (sometimes referred to as "partitioning by key"). When records are allowed to have ambiguous cluster membership, partitioning may be done on a key associated to each cluster. Under this partitioning scheme, the total allocation within a partition associated to a given record may be less than unity. The interpretation of this is analogous to that with filtering: it measures the allocation of the record to the partition against the alternative of not being in the partition.

Suppose that ACME Services Limited has a 0.5 allocation to the group containing ACME Services Australia Limited and a 0.5 allocation to the group containing ACME Services Canada Limited. A partition by key operation may allocate the group containing ACME Services Australia Limited to one partition and ACME Services Canada Limited to another partition. The total allocation in the latter partition associated to ACME Services Limited record is 0.5, reflecting its association with the ACME Services Canada Limited cluster, against the alternative of 0.5 that it is in some other partition(s).

Parallel versions of the familiar data operations may be defined by their behavior within a single partition, with no communication between the partitions. When the total allocation within a partition for a record is less than unity, this is to be interpreted in the sense defined here.

(3) Rollup and Partial Membership

The Rollup operation aggregates or summarizes data from the level of individual records to a group level. In the exact key case, a keygroup is defined as the set of records sharing a common key (value). In the cluster case, a group is defined as the set of records whose members are determined by a comparison test, with the possibility that one or more records may be members of one or more groups.

Additive (also multiplicative, for example, by adding logarithms) numerical aggregation (sometimes called "computing additive measures") in cluster groups is done as a weighted aggregate using the allocation measure for the weight. Bounding values are computed by computing the (unweighted) aggregation for the alternatives where all records having a partial allocation to the set are either included in the set or are excluded from the set. The following list of records is a cluster group based on company name

| cluster_key | alloc_measure | company_name | count |
|---|---|---|---|
| c1 | 1.0 | ACME Services Australia Limited | 80 |
| c1 | 1.0 | ACME Services (AUS) Limited | 60 |
| c1 | 0.5 | ACME Services Limited | 100 |

The rollup to determine the total count in the cluster is the weighted sum

80*1.0+60*1.0+100*0.5=190 with the bounding values (exclusive) 80*1.0+60*1.0+100*0.0=140, (inclusive) 80*1.0+60*1.0+100*1.0=240.

The result for the total count in the cluster group may be expressed as 190 (140, 240).

Non-additive summarization is done by considering the extreme cases where records having partial allocations are either included or excluded from the set. The allocation measure can often be used to assign a confidence to the result obtained by including partial members. As an example, records may be sorted within a cluster group on some secondary key, and the rollup may determine which record is first in the sort order. The following list sorts the previous list of records in descending order on count.

| cluster_key | alloc_measure | company_name | count |
|---|---|---|---|
| c1 | 0.5 | ACME Services Limited | 100 |
| c1 | 1.0 | ACME Services Australia Limited | 80 |
| c1 | 1.0 | ACME Services (AUS) Limited | 60 |

The rollup to determine the first record in the cluster group in this sort order (i.e. the maximum count) gives the bounding results:
 (inclusive) c1 0.5 ACME Services Limited 100
 (exclusive) c1 1.0 ACME Services Australia Limited 80
The allocation measure of 0.5 can be provided with the inclusive result to indicate confidence associated with the inclusive result. In this example, the exclusive result can be considered a worst case result: the maximum is at least 80.

The rollup operation in the presence of partial membership may be conducted in parallel. To see this, consider first additive numerical aggregates. This is a weighted sum. Such a sum can be broken into partial sums which are computed separately and then combined. Each partial sum is a weighted sum which may be computed in its own parallel partition. This is the parallelization of the additive rollup.

Computation of the exclusive bound of both additive and non-additive rollups is parallelizable because by definition all partial members are excluded. Thus the computation reduces to an ordinary rollup which is parallelizable (in most cases).

Computation of the inclusive bound is parallelizable under certain conditions to prevent double-counting of inclusions. For rollups within a cluster, each partial member only occurs once within the cluster. Therefore the inclusive bound can be computed as a sum of partial sums within a cluster without double counting any members.

If a rollup is performed across clusters, there may be contributions from the same record appearing in different clusters. This is okay for additive measures because the weights associated with each instance of the record add to give a new overall weight. For the inclusive bound however, each record must only be included once. Generally this requires keeping track in some way of which records occur, and this operation is not parallelizable.

If however individual records are identified by a key, say rec_key, prior to clustering, and the data (after clustering) is parallel partitioned on rec_key, then all records having the same rec_key will occur in the same partition. Rollup within this partition can properly compute the inclusive bound since all relevant records are present, even if done across clusters. The inclusive bounds across partitions can then be safely combined across partitions because no individual record has instances on more than one partition so there is no possibility of double-counting.

(4) Search

In exact data operations, exact keys are used. For example, in a search operation, a key is used and all the records that exactly match that key are retrieved. In fuzzy data operations, fuzzy keys are used.

In some arrangements, fuzzy operations are carried out as a series of exact data operations, as illustrated below using search operation as an example.

In the above customer address database example, the company is interested in finding all the pending mail packages that have been sent to a person named John Smith. A search operation can be used for that purpose. The search operation can be carried out using the two-part key "John Smith;ox2 6qt" with the zip code "ox2 6qt" being the correct zip code associated with John Smith. This exact search operation, however, will not retrieve those pending mail packages that were sent to John Smith but were mistakenly associated with key "John Smith;ox2 6qx" or "John Smith;ox26qt" due to typographical errors made by the mail clerk when making the entries.

To overcome this limitation, a fuzzy search, which is a search associated with a fuzzy key, can be used. A fuzzy key is one of a set of keys that includes a primary key plus all variants that fall within a specified distance of that key. In the above customer address example, a fuzzy key used in the pending mail package search may be defined to include the primary key, "John Smith;ox2 6qt" plus all the variants that fall within a distance of two operations.

In some arrangements, the fuzzy search operation performed on the fuzzy key (the primary John Smith ox2 6qt plus four variants, ox2 6qx, ox2 6qy, ox26qy and ox26qt) can be carried out in the following fashion. In step one, perform an exact search on the primary key "John Smith ox2 6qt". Then, in steps two to five, perform four exact searches on the variants that are part of the fuzzy key. In the final step, step six, combine the results retrieved from the above steps one to five. The combined result is the result of the fuzzy search using the fuzzy key.

When searching on a multi-word field, like a company name or address, it may not be possible to determine the set of variants of that field in advance for the previous procedure to be used directly. Two alternative strategies may be employed. Suppose that a search is being made for all account records associated with the company ACME Services Ltd at 2 Plater Drive, Oxford. In the first strategy, a single-word field, for example, the zip code ox2 6qt, is used as a search key. All records having the key "ox2 6qt" or one of its variants within a fixed distance are retrieved by an exact search as "prospective matches" or "prospects." The company name and address of each prospect are separately scored against the query company name and address.

Addresses are typically compared initially by concatenating all fields constituting the address into a single string. This has several advantages. First, it puts addresses from different sources into a simple common format. Since the phrase scoring functions are tolerant of missing words or changes in word order, it does not matter that the original fields holding the elements of the source addresses may have been incompletely or inconsistently populated. Equally, the common format is reached without having to parse the address into standard address elements. Parsing typically requires accurate reference data, like a Postal Address File, which may not be available, particularly in foreign countries. Also parsing is relatively expensive computationally, so avoiding it makes address comparison more better performing. If comparison of the concatenated address fields is inconclusive, parsing may be used as a backup attempt to refine the scoring.

The resulting company name and address scores are compared to (user-specified) match and suspect thresholds. A score exceeding the match threshold indicates the two compared phrases are sufficiently similar to constitute a match. A score exceeding the suspect threshold indicates the phrases are similar but are not sufficiently close to determine a match with confidence. A score for whether the entire record is a match is obtained by combining the scores for individual fields or combinations of fields (i.e. the concatenated address). Users specify criteria which determine which information must agree and how closely. For example, the city field may be allowed to disagree if the postcodes agree. (In the United Kingdom, for example, there is surprising latitude in what constitutes a valid address, with variation tolerated for both the name of the town and the presence or absence of a house number.)

A second strategy is to select words from one or more fields and to use these as fuzzy search keywords. Such words can be chosen as the leading words in a field or on the basis of their significance. Significance is computed from the negative log of the ratio of the number of occurrences of a word or one of its variants in a field (or combination of fields) to the number of times that field (or fields) is populated.

Once the fuzzy search keywords are chosen, each word (and its variants) is looked up in an index of source records by word. This returns a list of indexes of source records which contain the chosen word in a given field. Suppose the search keywords are "Lower", "Islip" sought in any address field of the Postal Address File. The word "Lower" might occur in the organization, the street name and the town fields. "Islip" may only occur as a town. Searching on each word gives a list of indexes of records in which the word is found. Intersecting the two lists gives the set of records that contain both words (or their variants). These form a set of prospect records. Because the prospect records are known to contain a certain number of the search words, they have been effectively pre-qualified. The more search words required to be held in common, the higher the score between the fields is likely to be.

After applying a filter to only keep, say, records that contain two or more search words, the full records are retrieved and scored against one another. The resulting scores are sorted in descending order. An ambiguity measure could be computed for the set of matches and this would increase the information characterizing the quality of match of the query against the reference.

(5) Fuzzy Join

A fuzzy join is similar to a fuzzy search except that instead of using a lookup to retrieve the records, a join is done instead where the entire reference dataset is read and processed against the query dataset. This can be useful for both performance and control. If a reference dataset is too large to fit in memory as an ordinary lookup, it may instead be accessed as a (possibly block-compressed) loadable lookup which is held on disk (ref. Ab Initio loadable lookups). As each search term is processed, the appropriate pages of the lookup table are accessed from disk. If a sufficiently large fraction (for example, 10%) of the reference dataset needs to be accessed, it works out to be more efficient to read the entire reference dataset in sorted order in a single pass than proceed with a random-access search. This reduces repeated disk accesses performed by the search process.

From the control perspective, if a search requires access to multiple reference datasets, a join may be a more convenient way to bring the data from the reference datasets together for scoring. Suppose the query contains customer name and address in a single entry, but the reference data holds customer name and address is separate tables. There may be a third linking table connecting customer name and address. If the target reference data is held in different tables, it is not possible to compare directly the record indexes returned by searching the index file for the search keywords because the indexes refer to records in different datasets. If a key is assigned to the query, then separate searches can be made against each dataset and a join on the query-key will combine the results of these searches and allow the prospects to be fetched and scored.

If a measure of ambiguity is computed as part of the output of a fuzzy join, then it is possible for multiple matches to result from a join operation, each with a partial membership. Suppose for example, that an address with no house number is joined against the Postal Address File to pick up the name of the organization that the postal address file has on record at that address. Three addresses in the Postal Address File on the appropriate street do not have an organization and can therefore be combined for the purposes of identifying the organization. Two distinct organizations ACME Ltd and Standard Corp. are present at other matching addresses. An equipartition measure of ambiguity would count the number of equivalent occurrence. The output of the join would initially be five records, one for each matching address. A subsequent rollup to organization at the address (to determine the measure of ambiguity) would lead to an equipartition measure of ambiguity showing the likelihood the organization is either blank (3/5), ACME Ltd (1/5), Standard Corp. (1/5). This result could then be normalized to three records, each with a distinct organization and an associated partial membership.

Query: join on address to pick up organization

Query address: Lower Street, ox2 6qt

| Organization | Address |
| --- | --- |
| — | 2 Lower Street, ox2 6qt |
| — | 3 Lower Street, ox2 6qt |
| ACME Ltd | 4 Loower St, ox2 6qt |
| — | 5 Lower St, ox2 6qy |
| Standard Corp. | 8 Lower St., ox2 6qt |

Result:

| Organization | Address | Allocation key | Partial membership |
| --- | --- | --- | --- |
| — | Lower Street, ox2 6qt | a1 | 0.6 |
| ACME Ltd | Lower Street, ox2 6qt | a1 | 0.2 |
| Standard Corp. | Lower Street, ox2 6qt | a1 | 0.2 |

(6) Sort and Partial Membership

A (fuzzy) sort which orders records when membership is partial is straightforward to define. For records with ambiguous association, a record for each alternative is created, together with its allocation (measure of ambiguity). Suppose the reference records in the previous example are sorted with the output of the join against the query record. The rule is that partial membership is sorted after full membership in descending order of membership. Subsort on other fields is applied after partial membership is applied. Thus partial membership against one field takes precedence to later keys. This is to preserve the principle that the application of an additional sort field, sorts records within the established order but without changing the higher level order.

Sort {organization fractional; address}:

| | | | |
| --- | --- | --- | --- |
| — | 2 Lower Street, ox2 6qt | — | 1.0 |
| — | 3 Lower Street, ox2 6qt | — | 1.0 |
| — | 5 Lower St, ox2 6qy | — | 1.0 |
| — | Lower Street, ox2 6qt | a1 | 0.6 |

-continued

| | | | |
|---|---|---|---|
| ACME Ltd | 4 Loower St, ox2 6qt | | |
| ACME Ltd | Lower Street, ox2 6qt | a1 | 0.2 |
| Standard Corp. | 8 Lower St., ox2 6qt | | |
| Standard Corp. | Lower Street, ox2 6qt | a1 | 0.2 |

Having applied a fuzzy sort of this kind, a (sorted) fuzzy rollup to organization can be made based on the organization name without having to store temporary results until all of the data is seen. This is one of the principle uses of sorted data: so that the rollup operation can complete as each key group completes.

The fuzzy merge operation is analogous to the fuzzy sort. It simply applies the ordering rule to each record on its inputs to determine which record is next in the sort order. Suppose the above dataset is merged with the following one

| | | | |
|---|---|---|---|
| ACME Ltd | Lower Street, ox2 6qt | a2 | 0.9 |
| Standard Corp. | Lower Street, ox2 6qt | a2 | 0.1 |

The merged data is
Merge {organization fractional address}:

| | | | |
|---|---|---|---|
| — | 2 Lower Street, ox2 6qt | — | 1.0 |
| — | 3 Lower Street, ox2 6qt | — | 1.0 |
| — | 5 Lower St, ox2 6qy | — | 1.0 |
| — | Lower Street, ox2 6qt | a1 | 0.6 |
| ACME Ltd | 4 Lower St, ox2 6qt | | |
| ACME Ltd | Lower Street, ox2 6qt | a2 | 0.9 |
| ACME Ltd | Lower Street, ox2 6qt | a1 | 0.2 |
| Standard Corp. | 8 Lower St., ox2 6qt | | |
| Standard Corp. | Lower Street, ox2 6qt | a1 | 0.2 |
| Standard Corp. | Lower Street, ox2 6qt | a2 | 0.1 |

(h) Usefulness of Fuzzy Data Operations: Addressing Mistakes and Uncertainties and Preserve Accounting Integrity.

As demonstrated in the above fuzzy search example, fuzzy search operations can retrieve records that conventional searches using exact keys will miss, for instance, those records that contain typographic errors.

Also as mentioned above, when a classification of a piece of data depends on a pending outcome, clustering or partial membership can be used to accurately capture the uncertainty. At an immediate level, clustering or partial membership may be viewed as equivalent to a combination or a series of discrete non-fuzzy operations. But a few steps away, clustering or partial membership will allow better handling or prediction. In the above example in which an organization's annual budget depends on a pending court decision regarding whether the organization qualifies as a charitable organization or not, an annual budget can be prepared based on the probabilities of a court decision coming out favorably or adversely.

More specifically, an annual budget may be reserved as following:

Reserved tax payment =
   Tax payment based on non-charitable organization status X
   the probability of an adverse court decision
   +
   Tax payment based on charitable organization status X
   the probability of a favorable court decision Using the above formula to calculate the reserved tax payment presents a better overall picture of the financial status of the organization and facilitates risk assessments by the upper management. It also gives downstream applications a more reliable figure to rely on, allowing, for example, market analysts to better predict the financial prospects of the organization.

Partial memberships are also useful in preserving accounting integrity. For example, in ABC Corp's human resource database, we see that John Smith's medical expenses will not be double counted if his memberships in the marketing department and R&D department are 0.5 each.

The approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for clustering data elements stored in a data storage system, the method including:
   reading data elements from the data storage system;
   forming clusters of data elements with each data element being a member of at least one cluster and with assignment of a given data element as a member of a given cluster being based at least in part on contents of one or more objects in the given data element;

associating at least one data element with two or more clusters, with memberships of the data element belonging to respective ones of the two or more clusters being represented by a measure of ambiguity that quantifies partial membership of a given data element in a given cluster based at least in part on a comparison between contents of the given data element and contents of at least one other data element in the given cluster, the contents of the given data element including at least one of: one or more of words in one or more objects in the given data element, and variants of the one or more words;

storing information in the data storage system to represent the formed clusters; and performing a data operation that uses values of the measure of ambiguity representing the memberships;

wherein the data operation includes a rollup that calculates a weighted subtotal of a quantity of the one or more clusters, the quantity being associated with the data element, and the subtotal being calculated by summing the products of the value of the quantity associated with each of the data elements in the first cluster and the respective value of the measure of ambiguity representing the membership of the data elements in the first cluster.

2. The method of claim 1, further including preserving accounting integrity using values of the measure of ambiguity.

3. The method of claim 2, wherein the preservation of accounting integrity for a given quantity is achieved by weighting the quantity with values of the measure of ambiguity.

4. The method of claim 1, further including calculating an exclusive subtotal of the quantity and an inclusive subtotal of the quantity, the exclusive subtotal being calculated by excluding the data elements in the first cluster that are associated with two or more clusters and the inclusive subtotal being calculated by including the data elements in the first cluster that are associated with two or more clusters.

5. The method of claim 1, wherein values of the measure of ambiguity representing the memberships are established based on a function, the function representing relationships between the data element and the two or more clusters.

6. The method of claim 5, wherein the relationships represented by the function are based on quantified similarities between the data element and elements representing respective ones of the two or more clusters.

7. The method of claim 6, wherein the elements representing the respective ones of the two or more clusters are keys of the respective clusters.

8. The method of claim 1, wherein values of the measure of ambiguity of the data element belonging to each cluster of the two or more clusters are based on observed frequencies of the data element in a reference set.

9. The method of claim 1, wherein each cluster of the two or more clusters represents a different potential error in the data element, and values of the measured ambiguity of the data element belonging to each cluster of the two or more clusters are based on the likelihood of the potential error in the data element represented by each cluster.

10. The method of claim 1, wherein forming data clusters includes forming a plurality of superclusters of data elements and for each supercluster forming clusters of data elements within the supercluster.

11. The method of claim 10, wherein forming each supercluster includes determining matches between objects in different data elements based on a variant relation between the objects in the different data elements.

12. The method of claim 11, wherein the variant relation between a first object and a second object corresponds to a value of a function representing a distance between the first object and the second object being below a predetermined threshold.

13. The method of claim 12, wherein the variant relation is not an equivalence relation.

14. The method of claim 10, wherein at least one data element is in more than one supercluster.

15. The method of claim 1, wherein the measure of ambiguity is affected by the possible alternative assignment of the data element to other clusters.

16. A system for clustering data elements stored in a data storage system, the system including:

means for reading data elements from the data storage system;

means for forming clusters of data elements with each data element being a member of at least one cluster;

means for associating at least one data element with two or more clusters, with memberships of the data element belonging to respective ones of the two or more clusters being represented by a measure of ambiguity;

means for storing information in the data storage system to represent the formed clusters; and means for performing a data operation that uses values of the measure of ambiguity representing the memberships;

wherein the data operation includes a rollup that calculates a weighted subtotal of a quantity of the one or more clusters, the quantity being associated with the data element, and the subtotal being calculated by summing the products of the value of the quantity associated with each of the data elements in the first cluster and the respective value of the measure of ambiguity representing the membership of the data elements in the first cluster.

17. The system of claim 15, further including means for preserving accounting integrity using values of the measure of ambiguity.

18. The system of claim 17, wherein the preservation of accounting integrity for a given quantity is achieved by weighting the quantity with values of the measure of ambiguity.

19. The system of claim 15, further including means for calculating an exclusive subtotal of the quantity and an inclusive subtotal of the quantity, the exclusive subtotal being calculated by excluding the data elements in the first cluster that are associated with two or more clusters and the inclusive subtotal being calculated by including the data elements in the first cluster that are associated with two or more clusters.

20. The system of claim 15, wherein values of the measure of ambiguity representing the memberships are established based on a function, the function representing relationships between the data element and the two or more clusters.

21. The system of claim 20, wherein the relationships represented by the function are based on quantified similarities between the data element and elements representing respective ones of the two or more clusters.

22. The system of claim 21, wherein the elements representing the respective ones of the two or more clusters are keys of the respective clusters.

23. The system of claim 15, wherein values of the measure of ambiguity of the data element belonging to each cluster of the two or more clusters are based on observed frequencies of the data element in a reference set.

24. The system of claim 15, wherein each cluster of the two or more clusters represents a different potential error in the data element, and values of the measured ambiguity of the data element belonging to each cluster of the two or more clusters are based on the likelihood of the potential error in the data element represented by each cluster.

25. The system of claim 15, wherein forming data clusters includes forming a plurality of superclusters of data elements and for each supercluster forming clusters of data elements within the supercluster.

26. The system of claim 25, wherein forming each supercluster includes determining matches between objects in different data elements based on a variant relation between the objects in the different data elements.

27. The system of claim 26, wherein the variant relation between a first object and a second object corresponds to a value of a function representing a distance between the first object and the second object being below a predetermined threshold.

28. The system of claim 27, wherein the variant relation is not an equivalence relation.

29. The system of claim 15, wherein at least one data element is in more than one supercluster.

30. The system of claim 15, wherein the measure of ambiguity is affected by the possible alternative assignment of the data element to other clusters.

31. A computer-readable storage device storing a computer program for clustering data elements stored in a data storage system, the computer program including instructions for causing a computer to:
read data elements from the data storage system;
form clusters of data elements with each data element being a member of at least one cluster and with assignment of a given data element as a member of a given cluster being based at least in part on contents of one or more objects in the given data element;
associate at least one data element with two or more clusters, with memberships of the data element belonging to respective ones of the two or more clusters being represented by a measure of ambiguity that quantifies partial membership of a given data element in a given cluster based at least in part on a comparison between contents of the given data element and contents of at least one other data element in the given cluster, the contents of the given data element including at least one of: one or more of words in one or more objects in the given data element, and variants of the one or more words; and
store information in the data storage system to represent the formed clusters; and
perform a data operation that uses values of the measure of ambiguity representing the memberships
wherein the data operation includes a rollup that calculates a weighted subtotal of a quantity of the one or more clusters, the quantity being associated with the data element, and the subtotal being calculated by summing the products of the value of the quantity associated with each of the data elements in the first cluster and the respective value of the measure of ambiguity representing the membership of the data elements in the first cluster.

32. The computer-readable storage device of claim 31, wherein the computer program further includes instructions for causing a computer to preserve accounting integrity using values of the measure of ambiguity.

33. The computer-readable storage device of claim 32, wherein the preservation of accounting integrity for a given quantity is achieved by weighting the quantity with values of the measure of ambiguity.

34. The computer-readable storage device of claim 31, wherein the computer program further includes instructions for causing a computer to calculate an exclusive subtotal of the quantity and an inclusive subtotal of the quantity, the exclusive subtotal being calculated by excluding the data elements in the first cluster that are associated with two or more clusters and the inclusive subtotal being calculated by including the data elements in the first cluster that are associated with two or more clusters.

35. The computer-readable storage device of claim 31, wherein values of the measure of ambiguity representing the memberships are established based on a function, the function representing relationships between the data element and the two or more clusters.

36. The computer-readable storage device of claim 35, wherein the relationships represented by the function are based on quantified similarities between the data element and elements representing respective ones of the two or more clusters.

37. The computer-readable storage device of claim 36, wherein the elements representing the respective ones of the two or more clusters are keys of the respective clusters.

38. The computer-readable storage device of claim 31, wherein values of the measure of ambiguity of the data element belonging to each cluster of the two or more clusters are based on observed frequencies of the data element in a reference set.

39. The computer-readable storage device of claim 31, wherein each cluster of the two or more clusters represents a different potential error in the data element, and values of the measured ambiguity of the data element belonging to each cluster of the two or more clusters are based on the likelihood of the potential error in the data element represented by each cluster.

40. The computer-readable storage device of claim 31, wherein forming data clusters includes forming a plurality of superclusters of data elements and for each supercluster forming clusters of data elements within the supercluster.

41. The computer-readable storage device of claim 40, wherein forming each supercluster includes determining matches between objects in different data elements based on a variant relation between the objects in the different data elements.

42. The computer-readable storage device of claim 41, wherein the variant relation between a first object and a second object corresponds to a value of a function representing a distance between the first object and the second object being below a predetermined threshold.

43. The computer-readable storage device of claim 42, wherein the variant relation is not an equivalence relation.

44. The computer-readable storage device of claim 40, wherein at least one data element is in more than one supercluster.

45. The computer-readable storage device of claim 31, wherein the measure of ambiguity is affected by the possible alternative assignment of the data element to other clusters.

46. A system for clustering data elements stored in a data storage system, the system including:
an input device configured to read data elements from the data storage system;

at least one process configured to cluster data elements stored in a data storage system, the processing including forming clusters of data elements with each data element being a member of at least one cluster and with assignment of a given data element as a member of a given cluster being based at least in part on contents of one or more objects in the given data element;

associating at least one data element with two or more clusters, with memberships of the data element belonging to respective ones of the two or more clusters being represented by a measure of ambiguity that quantifies partial membership of a given data element in a given cluster based at least in part on a comparison between contents of the given data element and contents of at least one other data element in the given cluster, the contents of the given data element including at least one of: one or more of words in one or more objects in the given data element, and variants of the one or more words; and storing information in the data storage system to represent the formed clusters; and performing a data operation that uses values of the measure of ambiguity representing the memberships wherein the data operation includes a rollup that calculates a weighted subtotal of a quantity of the one or more clusters, the quantity being associated with the data element, and the subtotal being calculated by summing the products of the value of the quantity associated with each of the data elements in the first cluster and the respective value of the measure of ambiguity representing the membership of the data elements in the first cluster.

47. The system of claim 46, wherein the processing further includes preserving accounting integrity using values of the measure of ambiguity.

48. The system of claim 47, wherein the preservation of accounting integrity for a given quantity is achieved by weighting the quantity with values of the measure of ambiguity.

49. The system of claim 46, wherein the processing further includes calculating an exclusive subtotal of the quantity and an inclusive subtotal of the quantity, the exclusive subtotal being calculated by excluding the data elements in the first cluster that are associated with two or more clusters and the inclusive subtotal being calculated by including the data elements in the first cluster that are associated with two or more clusters.

50. The system of claim 46, wherein values of the measure of ambiguity representing the memberships are established based on a function, the function representing relationships between the data element and the two or more clusters.

51. The system of claim 50, wherein the relationships represented by the function are based on quantified similarities between the data element and elements representing respective ones of the two or more clusters.

52. The system of claim 51, wherein the elements representing the respective ones of the two or more clusters are keys of the respective clusters.

53. The system of claim 46, wherein values of the measure of ambiguity of the data element belonging to each cluster of the two or more clusters are based on observed frequencies of the data element in a reference set.

54. The system of claim 46, wherein each cluster of the two or more clusters represents a different potential error in the data element, and values of the measured ambiguity of the data element belonging to each cluster of the two or more clusters are based on the likelihood of the potential error in the data element represented by each cluster.

55. The system of claim 46, wherein forming data clusters includes forming a plurality of superclusters of data elements and for each supercluster forming clusters of data elements within the supercluster.

56. The system of claim 55, wherein forming each supercluster includes determining matches between objects in different data elements based on a variant relation between the objects in the different data elements.

57. The system of claim 56, wherein the variant relation between a first object and a second object corresponds to a value of a function representing a distance between the first object and the second object being below a predetermined threshold.

58. The system of claim 57, wherein the variant relation is not an equivalence relation.

59. The system of claim 55, wherein at least one data element is in more than one supercluster.

60. The system of claim 46, wherein the measure of ambiguity is affected by the possible alternative assignment of the data element to other clusters.

61. The system of claim 46, wherein the given data element is a record, the one or more objects in the given data element are one or more fields of the record, and the contents of one or more objects in the given data element include at least one of: a value from one field, a value from a part of one field, and a value from a combination of more than one field.

* * * * *

UNITED STATES PATENT AND TRADEMARK OFFICE
CERTIFICATE OF CORRECTION

PATENT NO. : 8,484,215 B2
APPLICATION NO. : 12/605007
DATED : July 9, 2013
INVENTOR(S) : Arlen Anderson It is certified that error appears in the above-identified patent and that said Letters Patent is hereby corrected as shown below:

In the Claims

Column 40, Line 41, In Claim 17, delete "claim 15," and insert -- claim 16, --

Column 40, Line 48, In Claim 19, delete "claim 15," and insert -- claim 16, --

Column 40, Line 55, In Claim 20, delete "claim 15," and insert -- claim 16, --

Column 40, Line 66, In Claim 23, delete "claim 15," and insert -- claim 16, --

Column 41, Line 3, In Claim 24, delete "claim 15," and insert -- claim 16, --

Column 41, Line 9 (Approx.), In Claim 25, delete "claim 15," and insert -- claim 16, --

Column 41, Line 25, In Claim 29, delete "claim 15," and insert -- claim 16, --

Column 41, Line 27, In Claim 30, delete "claim 15," and insert -- claim 16, --

Signed and Sealed this
First Day of October, 2013

Teresa Stanek Rea
*Deputy Director of the United States Patent and Trademark Office*